(12) United States Patent
Kosaka

(10) Patent No.: US 7,868,576 B2
(45) Date of Patent: Jan. 11, 2011

(54) DRIVE DEVICE, TRAVEL DEVICE, AND DRIVE DEVICE CONTROL METHOD

(75) Inventor: Yusuke Kosaka, Chofu (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 390 days.

(21) Appl. No.: 12/159,992

(22) PCT Filed: Aug. 13, 2007

(86) PCT No.: PCT/JP2007/066070
§ 371 (c)(1),
(2), (4) Date: Jul. 3, 2008

(87) PCT Pub. No.: WO2008/020640
PCT Pub. Date: Feb. 21, 2008

(65) Prior Publication Data
US 2010/0060225 A1 Mar. 11, 2010

(30) Foreign Application Priority Data
Aug. 18, 2006 (JP) .............................. 2006-223390

(51) Int. Cl.
*G05B 9/02* (2006.01)
(52) U.S. Cl. .................... 318/566; 318/563; 318/560
(58) Field of Classification Search ................. 318/566, 318/563, 560
See application file for complete search history.

(56) References Cited

U.S. PATENT DOCUMENTS 6,333,613 B1 * 12/2001 Watanabe et al. ........ 318/568.1
6,690,136 B2 * 2/2004 Matsumoto et al. ......... 318/623

FOREIGN PATENT DOCUMENTS

| JP | 9 128031 | 5/1997 |
| JP | 2002 99314 | 4/2002 |
| JP | 2002 323915 | 11/2002 |
| JP | 2004 510637 | 4/2004 |
| JP | 2004 320921 | 11/2004 |

* cited by examiner

*Primary Examiner*—Bentsu Ro
*Assistant Examiner*—David S Luo
(74) *Attorney, Agent, or Firm*—Oblon, Spivak, McClelland, Maier & Neustadt, L.L.P.

(57) ABSTRACT

The present invention may be applied to a drive device, a travel device, and a drive device control method which are suitable for use in a robot arm and a twin cycle, for example. By eliminating (reducing) the opportunity of the use exceeding a rated torque of a servo motor, it is possible to increase the machine reliability and set an appropriate safety factor so as to reduce device costs. The operation value during the actual machine operation obtained by {(effective torque)$^2$−(rated torque)$^2$}*(elapsed time from start) is compared with a value based on the rated torque, and the system driving is stopped and/or an alarm is started.

7 Claims, 22 Drawing Sheets

$H(n) = t_n(T_e^2(n) - T_r^2) \cdots \{(\text{EFFECTIVE TORQUE})^2 - (\text{RATED TORQUE})^2\} \times t_n$ $H_1 = T_r^2 - T_r^2 = 0 \cdots \{(\text{RATED TORQUE})^2 - (\text{RATED TORQUE})^2\}$ $H_2 = (2T_r)^2 - T_r^2 \cdots \{(\text{RATED TORQUE} \times 2)^2 - (\text{RATED TORQUE})^2\}$

DRIVE DEVICE, TRAVEL DEVICE, AND DRIVE DEVICE CONTROL METHOD

TECHNICAL FIELD

The present invention relates to a drive device, a travel device and a drive device control method which are suitable for use in a robot arm and a twin cycle, for example. Specifically, the present invention relates to a technique for enabling suitable drive control based on the rating which is specified for a drive system.

BACKGROUND ART

A device that controls a robot arm by controlling motor driving has been proposed (e.g., cf. Patent document 1).

A vehicle that travels with two wheels with a person on board has also been proposed (e.g., cf. Patent document 2).

Further, a method that protects a motor from overheating by detecting an effective torque has been proposed (e.g., cf. Patent document 3).

Thus, a technique for protection from overheating by detecting an effective torque in a robot arm or a twin cycle which is driven using a motor, for example, has been proposed.

[Patent document 1] Japanese Unexamined Patent Application Publication No. 9-128031
[Patent document 2] U.S. Pat. No. 6,288,505
[Patent document 3] Japanese Unexamined Patent Application Publication No. 2004-320921

DISCLOSURE OF THE INVENTION

Problems to be Solved by the Invention

In the design phase of a drive system of a related art, a necessary torque is estimated from the moment of inertia of a drive portion and an assumed operating pattern, an effective torque is calculated using the estimated value, and a servo motor with a rated torque that is higher than the calculated value is selected. Specifically, the operation of a drive system with a moment of inertia I and a friction torque $T_f$ in the operating pattern as shown in FIG. 11A, for example, is as follows.

If an angle is $\theta$ and an angular acceleration is $\theta^{(2)}$, a torque $T_1$ that is necessary for acceleration is estimated to be $T_1 = I\theta^{(2)} + T_f$, a torque $T_2$ that is necessary for constant speed travel is estimated to be $T_2 = T_f$, and a torque $T_3$ that is necessary for deceleration is estimated to be $T_3 = -I\theta^{(2)} + T_f$.

Thus, an effective torque $T_e$ of one operation cycle as shown in FIG. 11B is represented by the following expression:

$$T_e = \sqrt{\frac{T_1^2 t_1 + T_2^2 t_2 + T_3^2 t_3}{t_1 + t_2 + t_3 + t_4}} \qquad \text{[Expression 1]}$$

However, in the above technique of precalculating an effective torque, it is assured that the effective torque does not exceed a rated torque only in the operating pattern which is assumed at the time of design, and additional checking is necessary for the operating pattern which is not assumed in advance.

Further, because the above technique performs calculation using the moment of inertia and the friction torque which are estimated at the time of design, it fails to accurately calculate an effective torque in actual machine operation due to error factors (including an increase in load due to a machine failure) which are not taken into consideration in the estimation of a necessary torque such as an error between an actual moment of inertia and an estimated value, an error in friction torque that is difficult to estimate accurately, and a viscous friction that is dependant on a velocity. This causes a machine failure due to the use exceeding a rated torque of a servo motor or leads to a cost up due to an excess safety factor.

On the other hand, there is a technique of using a time history of a reference torque which is supplied to an amplifier in actual operation for the calculation of an effective torque. If a time varying reference torque is T(t) and an elapsed time from the start to the present is $t_n$, the effective torque is represented by the following expression:

$$T_e = \sqrt{\frac{\int_0^{t_n} T^2(t)\,dt}{t_n}} \qquad \text{[Expression 2]}$$

However, in such a calculation method, it is necessary to store all time varying reference torques from the start of operation to the present, which requires a large storage area. Although the use of the integral of one sampling before+the present reference torque eliminates the need for storing all time varying reference torques from the start of operation to the present, it might cause the overflow of the integral. Further, because a continuous machine operating time is generally as long as several hours, such calculation methods are not practical in any case.

The present invention has been made in view of the foregoing, and one issue is that a device of a related art fails to address an error factor which is different from the operating pattern that is assumed at the time of design.

Another issue is that a device of a related art fails to calculate an effective torque accurately and practically since it requires a large storage area, causes the overflow of an integral and so on.

Means for Solving the Problems

It is an object of the present invention to deal with an operating pattern which is not assumed by obtaining the value of {(effective torque)²−(rated torque)²}*(elapsed time from start) in actual machine operation and to increase machine reliability and set an appropriate safety factor so as to reduce device costs by eliminating (reducing) the opportunity of the use exceeding a rated torque of a servo motor.

It is another object of the present invention to eliminate the need for storing all time varying reference torques from the start of operation to the present and prevent the overflow of an integral in a practical use range by calculating {(effective torque)²−(rated torque)²}*(elapsed time from start) and devising a method of the calculation, thereby satisfying the above object.

It is yet another object of the present invention to prevent the occurrence of a malfunction such as a sudden breakdown of a drive device by avoiding the overheating of a motor amplifier due to the use exceeding a rated torque of a motor in the application to a twin cycle.

ADVANTAGES OF THE INVENTION

Therefore, according to the invention described in claim 1, by obtaining the operation value of {(effective torque)²−

(rated torque)$^2$}*(elapsed time from start) in actual machine operation, it is possible to deal with an operating pattern which is not assumed and to increase machine reliability and set an appropriate safety factor so as to reduce device costs by eliminating (reducing) the opportunity of the use exceeding a rated torque of a servo motor.

According to the invention described in claim 2, by obtaining the operation value by calculating (result of one unit time before)+{(present reference torque)$^2$−(rated torque)$^2$}*(unit time), it is possible to implement the operation based on an effective torque.

According to the invention described in claim 3, by comparing the calculated operation value with a value based on the rated torque and stopping driving of the system and/or starting an alarm according to a comparison result, it is possible to perform appropriate control.

Further, according to the invention described in claim 4, by obtaining the operation value of {(effective torque)$^2$−(rated torque)$^2$}*(elapsed time from start) in actual machine operation, it is possible to deal with an operating pattern which is not assumed, avoid the overheating of a motor amplifier by the use exceeding a rated torque of a motor, and prevent the occurrence of malfunction such as a sudden breakdown of a drive device.

According to the invention described in claim 5, by obtaining the operation value by calculating (result of one unit time before)+{(present reference torque)$^2$−(rated torque)$^2$}*(unit time), it is possible to implement the operation based on an effective torque.

According to the invention described in claim 6, by comparing the calculated operation value with a value based on the rated torque and stopping driving of the twin wheels and/or starting an alarm according to a comparison result, it is possible to perform appropriate control.

Furthermore, according to the invention described in claim 7, by obtaining the operation value of {(effective torque)$^2$−(rated torque)$^2$}*(elapsed time from start) in actual machine operation, it is possible to deal with an operating pattern which is not assumed and to increase machine reliability and set an appropriate safety factor so as to reduce device costs by eliminating (reducing) the opportunity of the use exceeding a rated torque of a servo motor.

Although a device of a related art fails to address an error factor which is different from the operating pattern that is assumed at the time of design and fails to calculate an effective torque accurately and practically since it requires a large storage area, causes the overflow of an integral and so on, it is possible to easily overcome such issues according to the present invention.

DESCRIPTION OF REFERENCE NUMERALS

11 Motor
12 Arm
13 Amplifier
14 Encoder
15 Control device
16 Effective torque monitoring device

BEST MODES FOR CARRYING OUT THE INVENTION

According to the present invention, there is provided a drive device which includes a setting unit to set a target state of a system having a prescribed rated torque, a detecting unit to detect an operating state of the system, and a control unit to drive the system by calculating a reference torque so as to bring the operating state closer to the target state, wherein the control unit calculates an operation value of {(effective torque)$^2$−(rated torque)$^2$}*(elapsed time from start) from start of the system to a present time using the calculated reference torque and controls driving of the system based on the calculated operation value.

According to the present invention, there is also provided a travel device which includes a driving unit to independently drive twin wheels having a prescribed rated torque and placed in parallel with each other, and a housing to couple the twin wheels, the housing including a detecting unit to detect a posture angle of the housing and a control unit to set a driving torque of the twin wheels according to information of the detected posture angle, the driving torque set by the control unit being used for driving the driving unit, wherein the control unit calculates an operation value of {(effective torque)$^2$−(rated torque)$^2$}*(elapsed time from start) from start to a present time using the driving torque set to the twin wheels and controls driving of the twin wheels based on the calculated operation value.

According to the present invention, there is further provided a control method of a drive device that sets a target state of a system having a prescribed rated torque, detects an operating state of the system, and drives the system by calculating a reference torque so as to bring the operating state closer to the target state, which includes calculating an operation value of {(effective torque)$^2$−(rated torque)$^2$}*(elapsed time from start) from start of the system to a present time using the calculated reference torque, and controlling driving of the system based on the calculated operation value.

Figure 1:
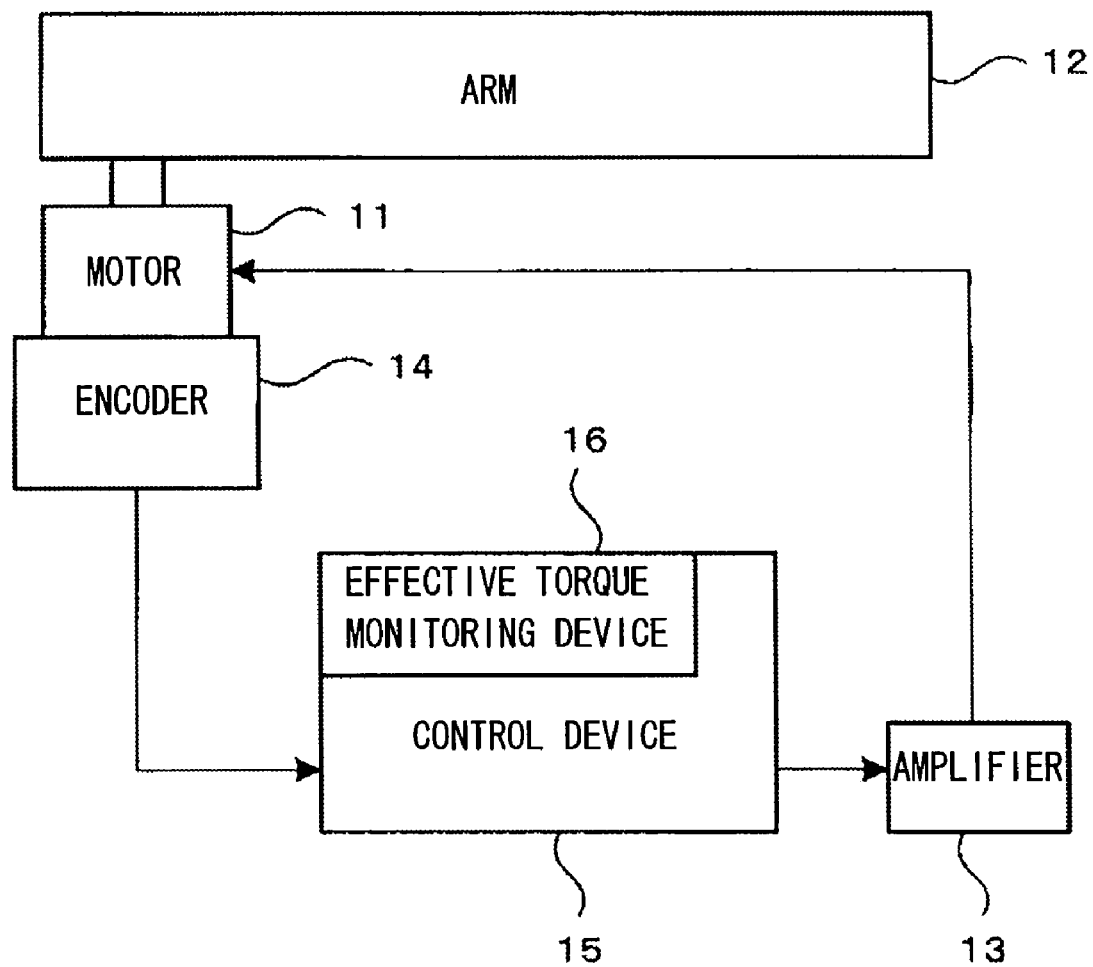
FIG. 1 A block diagram showing the structure of a robot arm to which a drive device, a travel device and a drive device control method according to the present invention are applied.

The present invention is described hereinafter with reference to the drawings. FIG. 1 is a block diagram showing the structure of a robot arm to which a drive device, a travel device and a drive device control method according to the present invention are applied.

Referring to FIG. 1, an arm 12 is operated by a motor 11. The motor 11 is driven by a driving power from an amplifier 13. The operation of the motor 11 is detected by an encoder 14 and fed back to a control device 15. The control device 15 includes an effective torque monitoring device 16. Although this structure illustrates only one axis of an industrial robot, because it is a basic structure with a motor and a load, the structure is applicable to any other systems (e.g. a system with a linear motor, a linear motion table with a rotation motor and a ball screw, a biped walking robot etc.).

In the structure of FIG. 1, the control device 15 calculates a torque that is necessary for motor drive by performing control operation such as PID control based on a motor angle which is detected by the encoder (angle detector) 14 and a target motor angle which is calculated in the control device 15 (or supplied to the control device 15 from the outside). The calculated necessary torque is input to the amplifier 13 as a reference torque, and the amplifier 13 drives the motor 11 so as to generate a torque according to the reference torque.

Importantly, the necessary torque which is calculated in the control device 15 is a necessary torque in actual operation which is calculated from a deviation between a target angle and an actually detected angle, not from a load or an operating pattern that is assumed in design, and therefore it is an actual value which takes all various error factors into consideration.

Specifically, the effective torque monitoring device 16 calculates $\{(\text{effective torque})^2 - (\text{rated torque})^2\} * t_n$ (where $t_n$ is an elapsed time from start) up to the present time by the following calculation. According to the calculated value, if the state where (effective torque)$^2$ exceeds (motor rated torque)$^2$ continues for a given length of time, the effective torque monitoring device 16 performs control such as stopping a motor or not accepting the next operation instruction until (effective torque)$^2$ falls below (motor rated torque)$^2$, thereby preventing the operation exceeding a motor rated torque from lasting long.

Further, the effective torque monitoring device 16 performs the following calculation.

The effective torque $T_e$ is defined as follows, where a time varying reference torque is $T(t)$ and an elapsed time from the start is $t_n$:

$$T_e(t_n) = \sqrt{\frac{\int_0^{t_n} T^2(t) dt}{t_n}} \quad \text{[Expression 3]}$$

Since a digital control system is used in practice, the effective torque $T_e$ is represented as follows, where a reference torque during n sampling is $T(n)$ and a sampling period is $\Delta t$:

$$T_e(n) = \sqrt{\frac{\sum_{k=0}^{n} T^2(k) \Delta t}{(n+1)\Delta t}} \quad \text{[Expression 4]}$$

However, this definition is not convenient because it uses the square root and the integral (integration) from the time 0 to the present. The use of the square root takes a long time for calculation, and the use of the integral (integration) requires storage of all time varying reference torques $T(t)$ ($T(n)$) and might causes the overflow of the integral (integration).

If the square of Expression 4 is calculated to eliminate the square root, the following expression is obtained:

$$T_e^2(n) = \frac{\sum_{k=0}^{n} T^2(k) \Delta t}{(n+1)\Delta t} \quad \text{[Expression 5]}$$

The denominator in the right hand side is transferred to the left hand side, thereby obtaining the following expression:

$$(n+1)\Delta t T_e^2(n) = \sum_{k=0}^{n} T^2(k) \Delta t \quad \text{[Expression 6]}$$

With the use of the rated torque $T_r$ of a motor, consider the following calculation:

$$(n+1)\Delta t T_r^2 \quad \text{Expression 7}$$

This can be represented as follows:

$$(n+1)\Delta t T_r^2 = \sum_{k=0}^{n} T_r^2 \Delta t \quad \text{[Expression 8]}$$

If Expression 8 is subtracted from Expression 6 in each side, the following expression is obtained:

$$(n+1)\Delta t T_e^2(n) - (n+1)\Delta t T_r^2 = \sum_{k=0}^{n} T^2(k) \Delta t - \sum_{k=0}^{n} T_r^2 \Delta t \quad \text{[Expression 9]}$$

If the above expression is transformed, the following expression is obtained:

$$(n+1)\Delta t (T_e^2(n) - T_r^2) = \sum_{k=0}^{n} (T^2(k) - T_r^2) \Delta t \quad \text{[Expression 10]}$$

$$t_n (T_e^2(n) - T_r^2) = \sum_{k=0}^{n} (T^2(k) - T_r^2) \Delta t$$

In this expression, the left hand side is $\{(\text{effective torque})^2 - (\text{rated torque})^2\} * t_n$.

The right hand side of the above expression can be further transformed as follows:

$$\sum_{k=0}^{n} \{T^2(k) - T_r^2\} \Delta t = \sum_{k=0}^{n-1} \{T^2(k) - T_r^2\} \Delta t + \quad \text{[Expression 11]}$$

$$\{T^2(n) - T_r^2\} \Delta t$$

$$= \left( \begin{array}{c} \text{result of one} \\ \text{sample before} \end{array} \right) +$$

$$\{T^2(n) - T_r^2\} \Delta t$$

Thus, the calculation of the right hand side of Expression 11 enables the calculation of the left hand side of Expression 10, which is, $\{(\text{effective torque})^2 - (\text{rated torque})^2\} * t_n$.

It should be noted that if the value of {(effective torque)$^2$–(rated torque)$^2$}*$t_n$ is negative, a calculation result is set to 0. This attributes to the physical meaning of an effective torque and a rated torque. A rated torque is the torque which maintains the thermally equilibrium state within the permissible temperature range (i.e. the temperature does not increase) when the torque is continuously output.

Thus, if an effective torque exceeds a rated torque, a temperature increases, and if an effective torque falls below a rated torque, a temperature decreases. However, even if the state where an effective torque is 0 continues, a temperature does not infinitely decrease but only returns to an initial temperature (ambient temperature). Because the minimum value of the effective torque which is calculated by a technique of a related art is 0, the minimum value of {(effective torque)$^2$–(rated torque)$^2$}*$t_n$ which is calculated by the presently proposed technique should be 0.

Therefore, as shown in Expression 11, if the effective torque monitoring device 16 operates appropriately based on the result of Expression 10, it is possible to prevent the continuance of the state where an effective torque is higher than a rated torque and to control an effective torque to be lower than a rated torque.

An exemplary operation is described hereinbelow. If the drive system of FIG. 1 is driven at the velocity which is indicated by the full line in FIG. 2A, a necessary torque is as indicated by the dotted line in FIG. 2A. In this case, the time varying reference torque $T_e$ which is described in Expression 2 is as shown in FIG. 2B. If the next operation is started at the time when the effective torque decreases to the rated torque, the operating pattern in which the effective torque is substantially equal to a rated torque is obtained in the long view.

However, the above method still cannot avoid the overflow of the integral as described above, and it is not suitable for actual use. If the calculation of Expression 10 is performed instead, the result is as shown in FIG. 2C, which is similar to the case of using an effective torque. It is often the case that a general motor amplifier is built to a specification which allows output of up to three times a rated torque provided it is for a short time, and a control such as a decrease in acceleration/deceleration or an increase in stop time is performed based on the value of {(effective torque)$^2$–(rated torque)$^2$}*$t_n$.

Figure 2A:
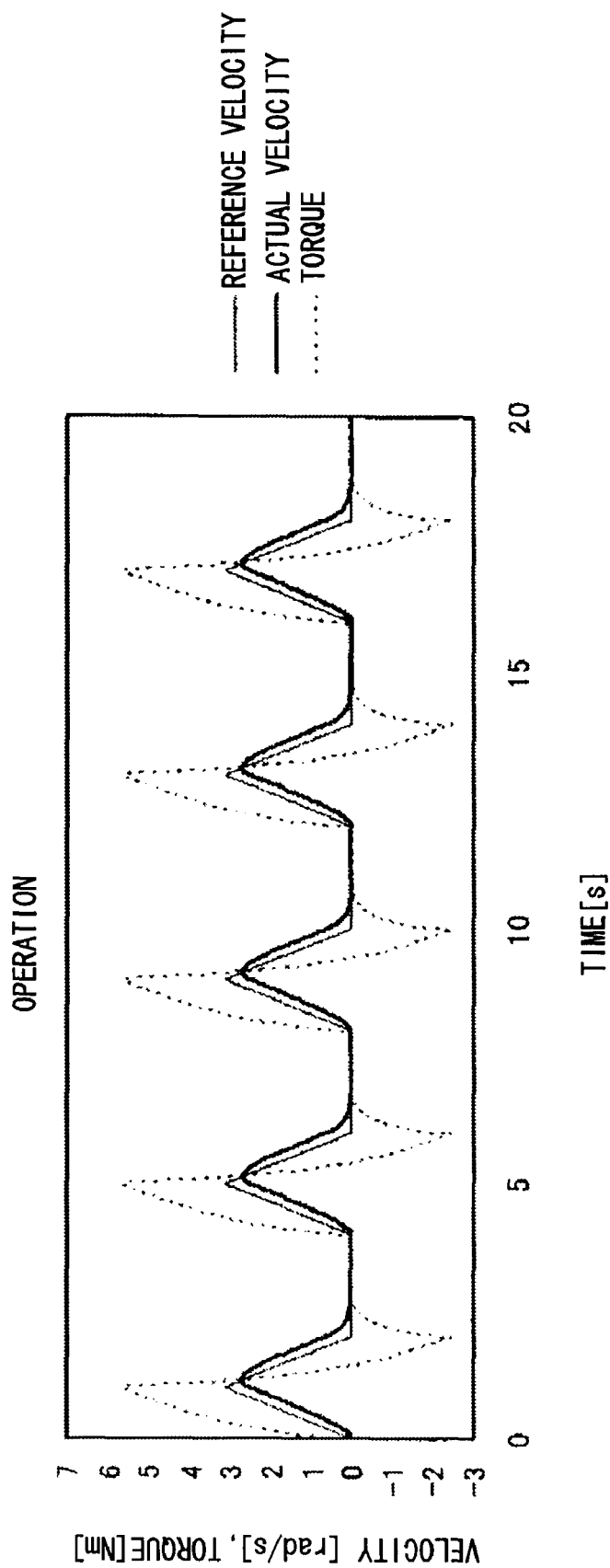
FIG. 2A A waveform chart to describe the operation.
Figure 2B:
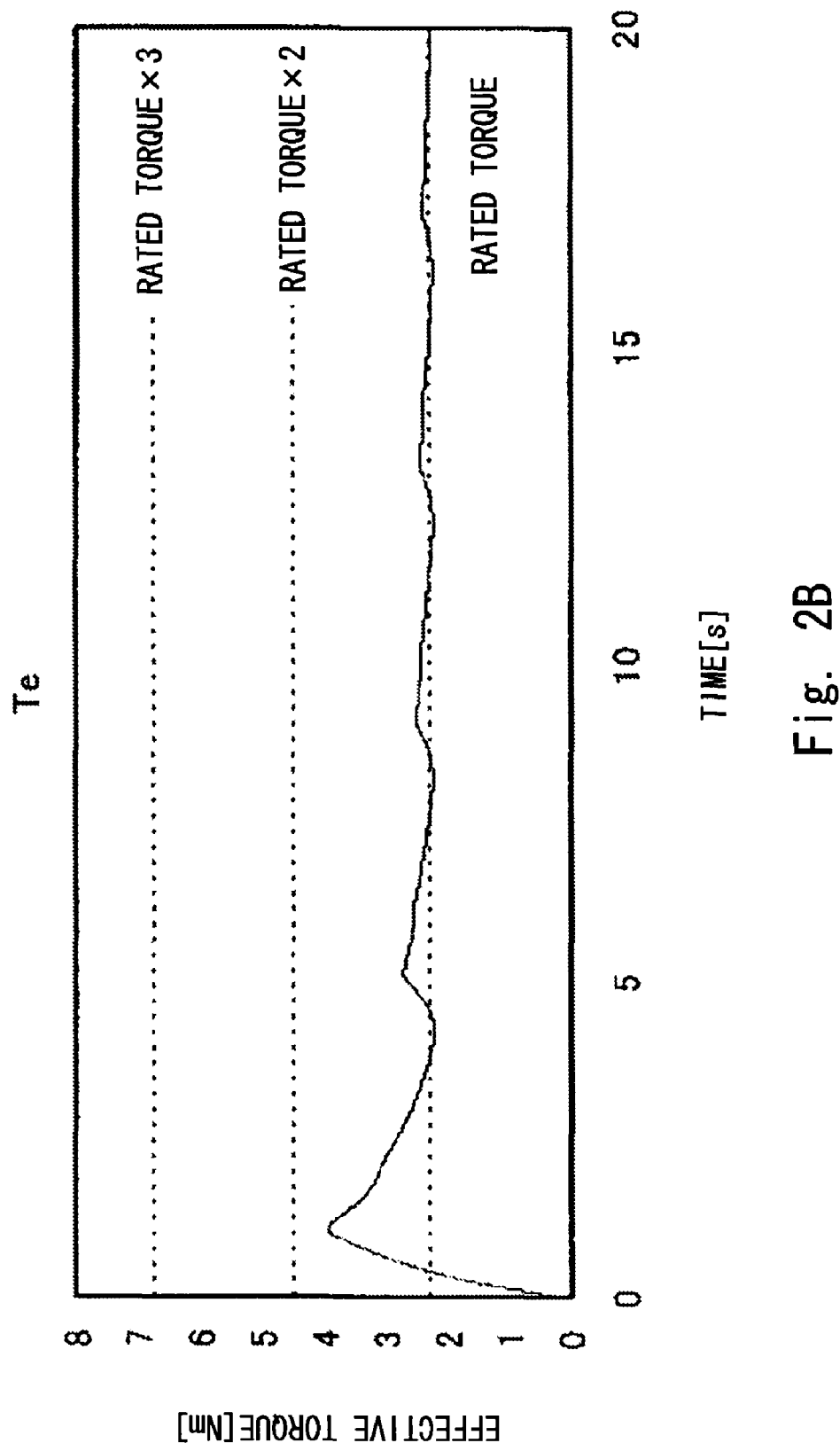
FIG. 2B A waveform chart to describe the operation.
Figure 2C:
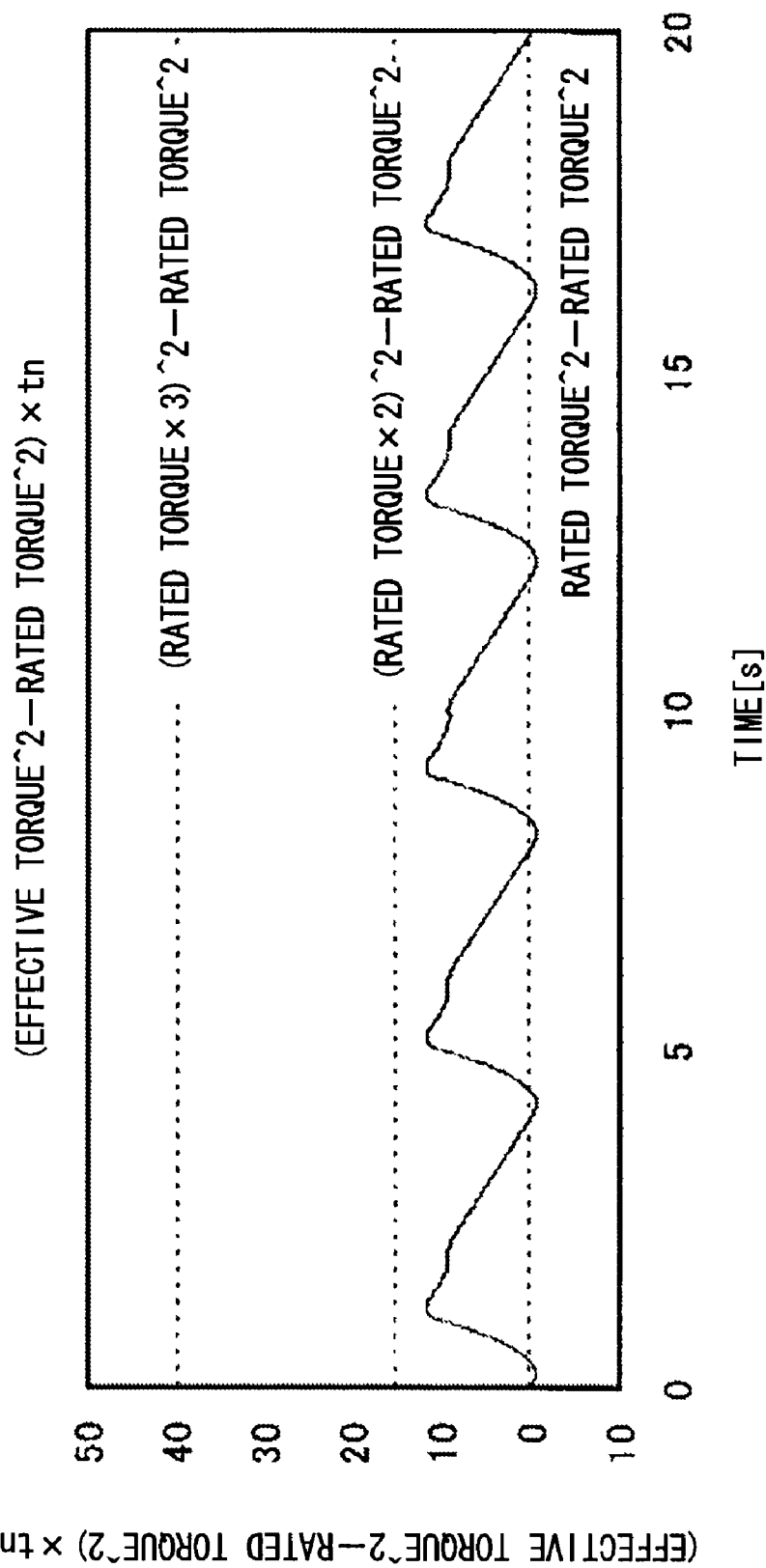
FIG. 2C A waveform chart to describe the operation.
Figure 3A:
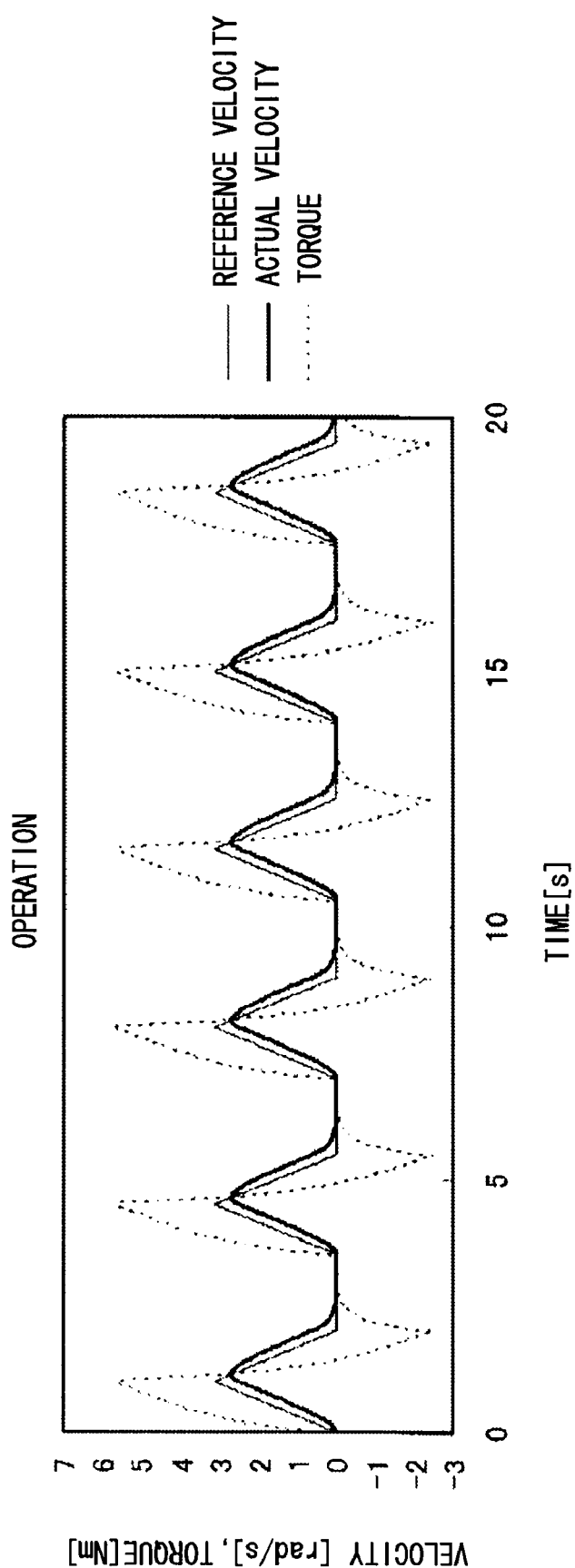
FIG. 3A A waveform chart to describe the operation.
Figure 3B:
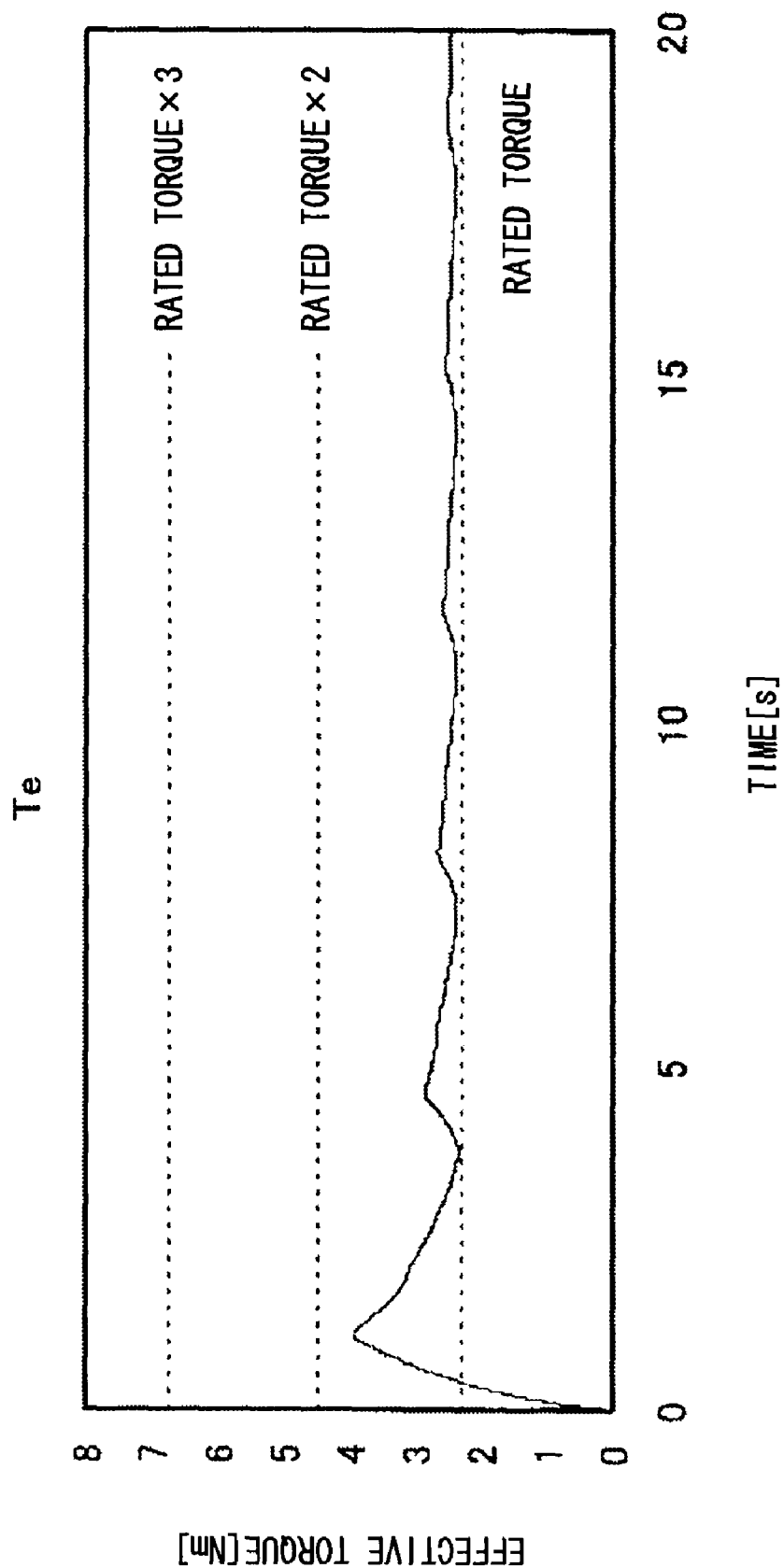
FIG. 3B A waveform chart to describe the operation.
Figure 3C:
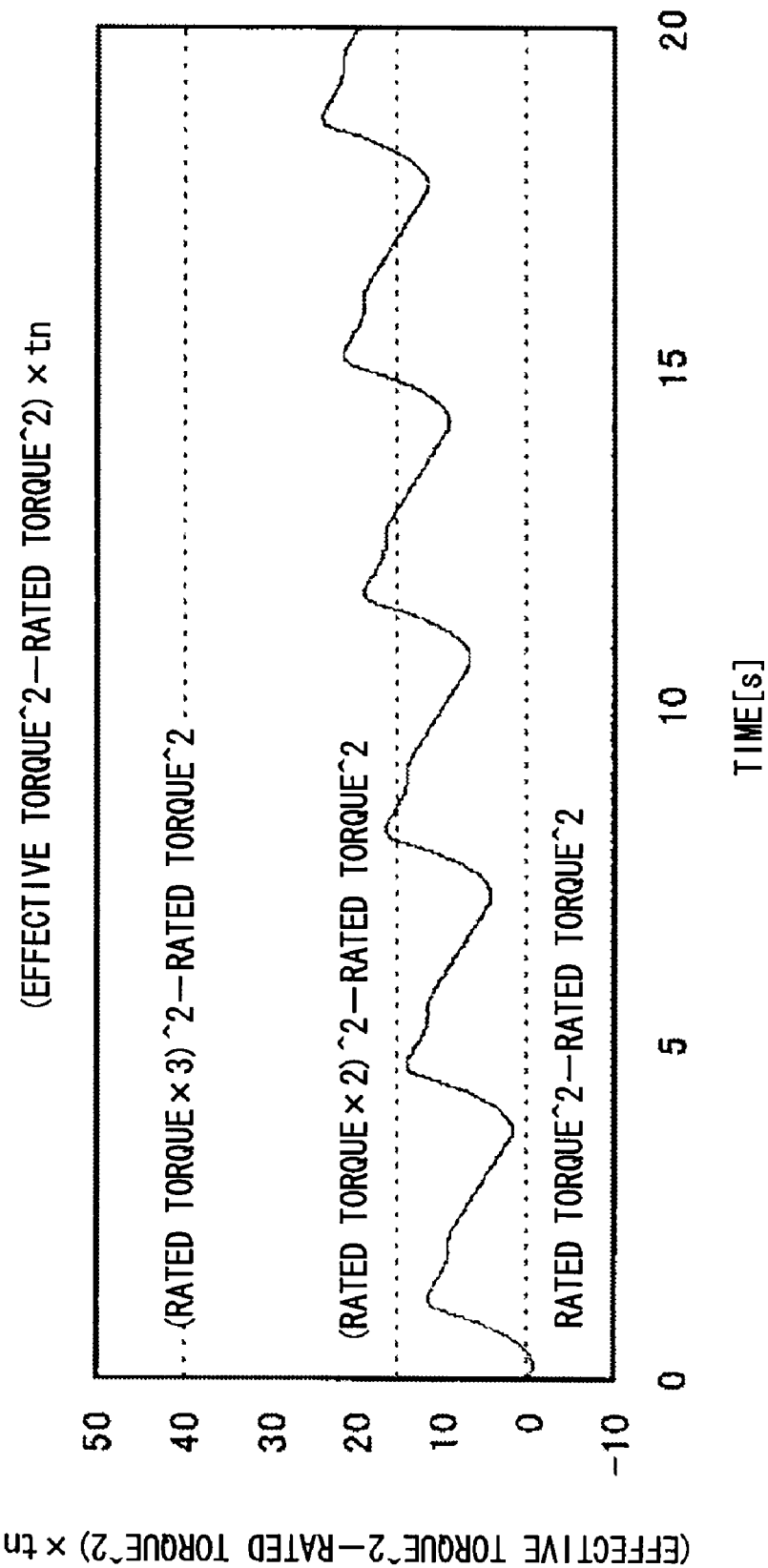
FIG. 3C A waveform chart to describe the operation.

FIG. 3 shows the case where a stop time is reduced by 0.5 second, for example, in the operation of FIG. 2. Although the waveform of FIG. 3A is the same as the waveform of FIG. 2A, because an effective torque does not decrease to a rated torque upon start after stop, an effective torque gradually increases in the waveform of FIG. 3B. Thus, the waveform of FIG. 3C is monitored, and if it tends to increase continuously, some change is made such as elongating a stop time to start the next operation after the value of {(effective torque)$^2$–(rated torque)$^2$}*$t_n$ decreases to 0.

On the other hand, because the calculation of Expression 10 can be substituted with {(result of one sample before)+(present reference torque$^2$–rated torque$^2$)*sampling time} as shown in Expression 11, it is possible to eliminate the need for a large storage area. Further, the result of the integration of Expression 10 does not positively overflow as long as the effective torque monitoring device 16 operates appropriately.

However, if a long time is passed after the operation is stopped or if the operation is performed with an effective torque that is significantly lower than a rated torque, the result of Expression 10 is negatively diverged. In order to avoid this, it is necessary to implement the operation that sets the value to 0 if an integration result is negative.

Therefore, according to the first embodiment, it is possible to deal with an operating pattern which is not assumed by obtaining the operation value of {(effective torque)$^2$–(rated torque)$^2$}*(elapsed time from start) in actual machine operation and to increase machine reliability and set an appropriate safety factor so as to reduce device costs by eliminating (reducing) the opportunity of the use exceeding a rated torque of a servo motor.

Although a device of a related art fails to address an error factor which is different from the operating pattern that is assumed at the time of design and fails to calculate an effective torque accurately and practically since it requires a large storage area, causes the overflow of an integral and so on, it is possible to easily overcome such issues according to the present invention.

A drive device according to the present invention includes a setting unit to set a target state of a system having a prescribed rated torque, a detecting unit to detect an operating state of the system, and a control unit to drive the system by calculating a reference torque so as to bring the operating state closer to the target state. The control unit calculates an operation value of {(effective torque)$^2$–(rated torque)$^2$}*(elapsed time from start) from the start of the system to the present using the calculated reference torque and controls the driving of the system based on the calculated operation value, thereby enabling dealing with an operating pattern which is not assumed and increasing machine reliability and setting an appropriate safety factor so as to reduce device costs by eliminating (reducing) the opportunity of the use exceeding a rated torque of a servo motor.

Figure 4A:
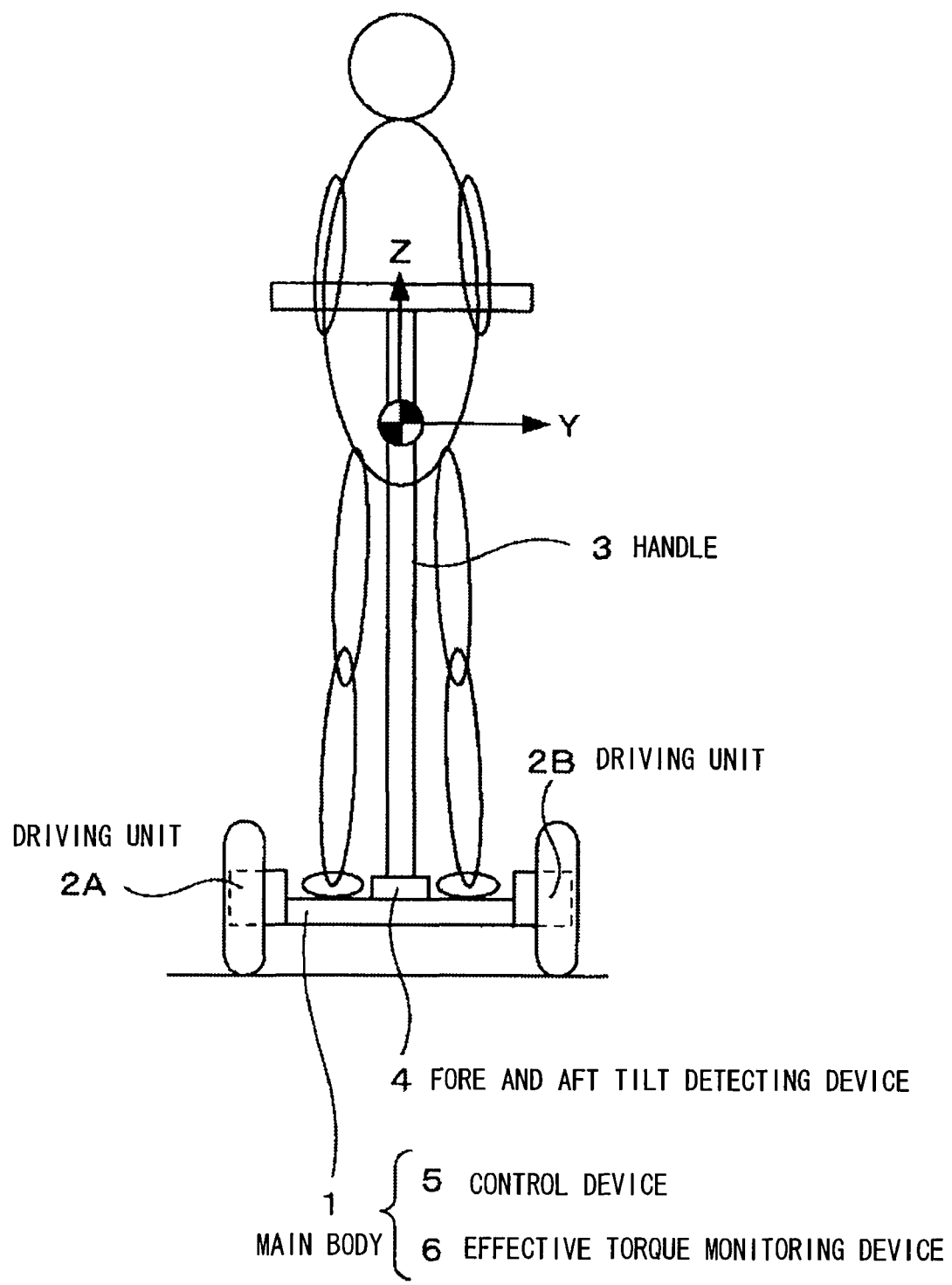
FIG. 4A A schematic diagram showing an embodiment of a twin cycle to which the present invention is applied.
Figure 4B:
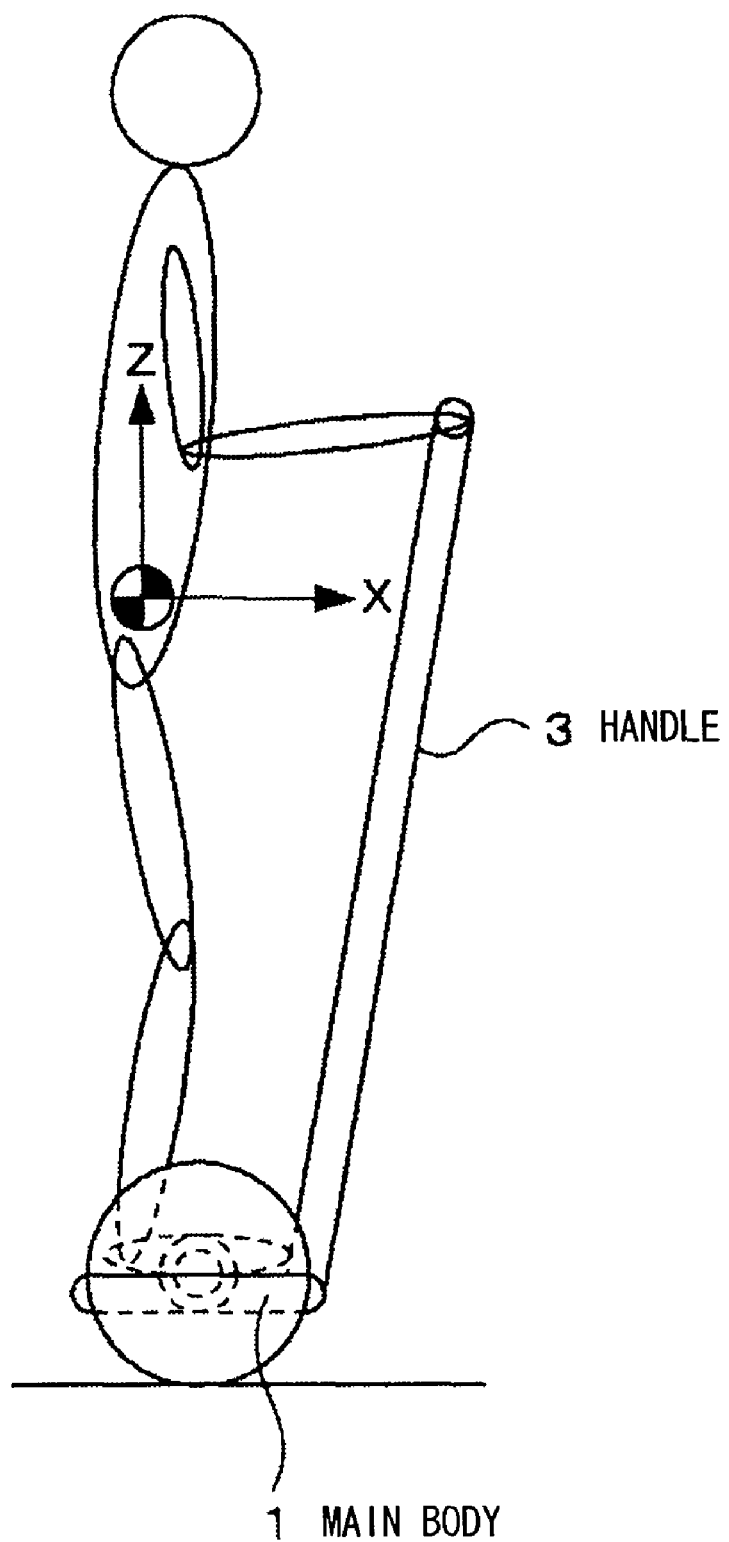
FIG. 4B A schematic diagram showing an embodiment of a twin cycle to which the present invention is applied.

FIG. 4 shows the structure of an embodiment of a twin cycle to which a drive device, a travel device and a drive device control method according to the present invention are applied. FIG. 4A is a front view, and FIG. 4B is a side view.

Referring to FIG. 4, the twin cycle according to this embodiment includes a main body (a part on which a user stands) 1, a pair of drive units 2A and 2B which are mounted coaxially with the main body 1, a handle 3 which a user holds, and a tilt detecting device 4 which detects a tilt in the fore and aft direction of the main body 1 (around Y-axis). On the main body 1, a stabilization control device 5 which controls a vehicle so as to stably follow its target angle, target angular rate and target vehicle velocity, and an effective torque monitoring device 6 are mounted.

Figure 5:
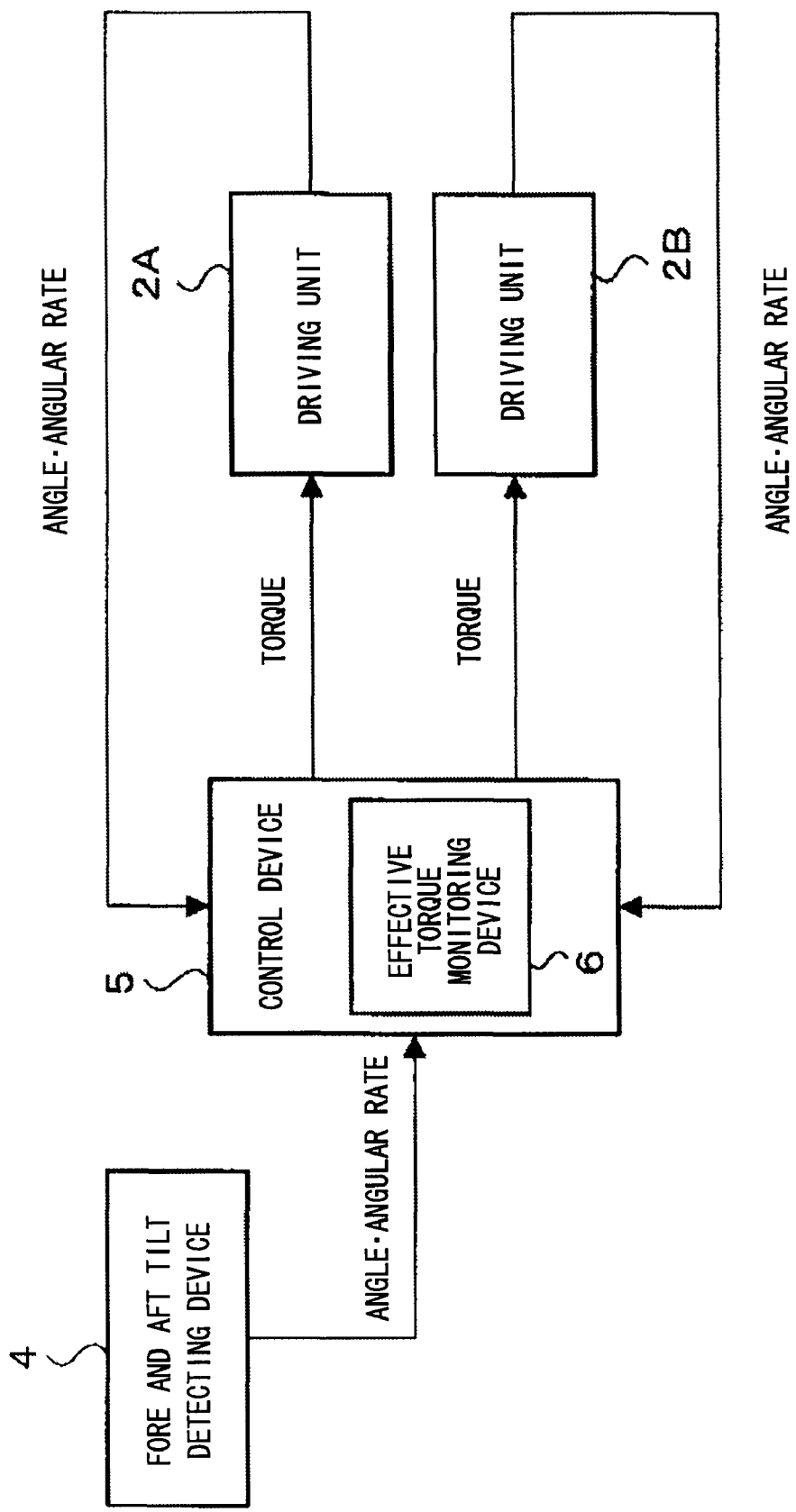
FIG. 5 A block diagram showing the structure.

FIG. 5 is a block diagram showing the structure of a twin cycle. Referring to FIG. 5, the control device 5 calculates a driving torque that is necessary for an entire system to be stabilized without falling down from the angle and the angular rate which are detected by the fore and aft tilt detecting device 4 and drives each motor of the drive units 2A and 2B. The twin cycle thereby moves forward or backward when a user displaces the center of gravity forward or backward.

Figure 6A:
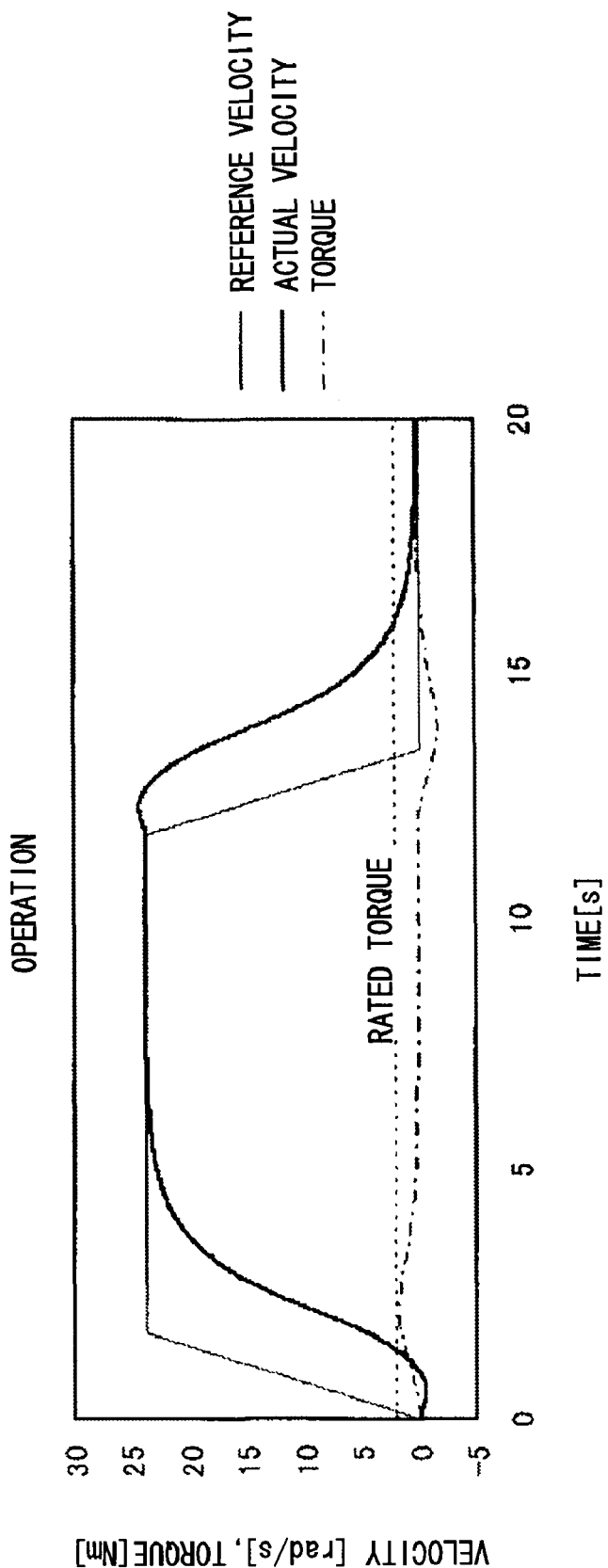
FIG. 6A A waveform chart to describe the operation.
Figure 6B:
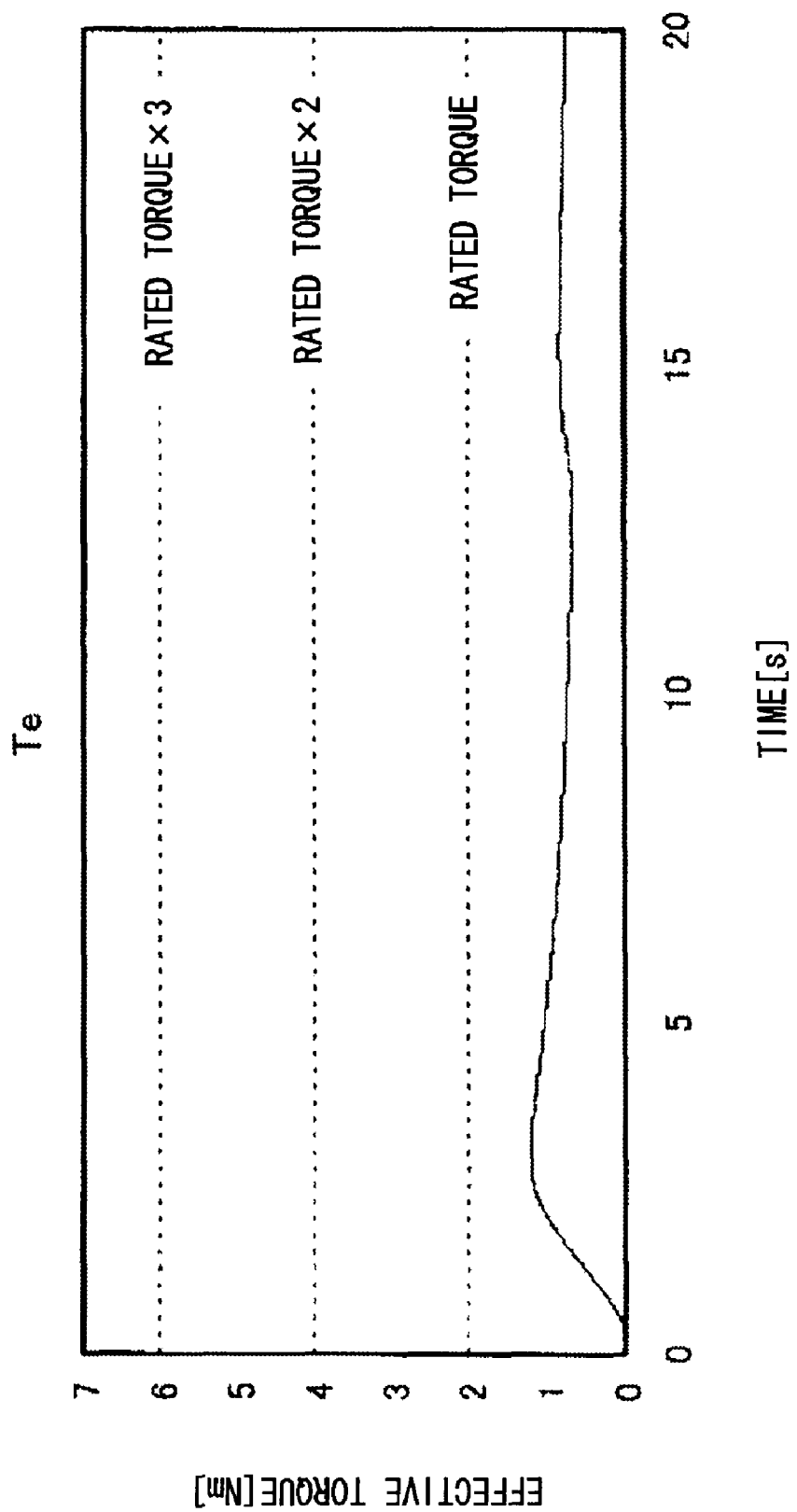
FIG. 6B A waveform chart to describe the operation.

The operation during normal traveling is described firstly. This is the case where a rated torque is not exceeded in spite of acceleration, deceleration, slope climbing and so on. In this case, the operation pattern is as shown in the waveform of FIG. 6A, and an effective torque does not exceed a rated torque at all times as shown in the waveform of FIG. 6B.

Figure 6C:
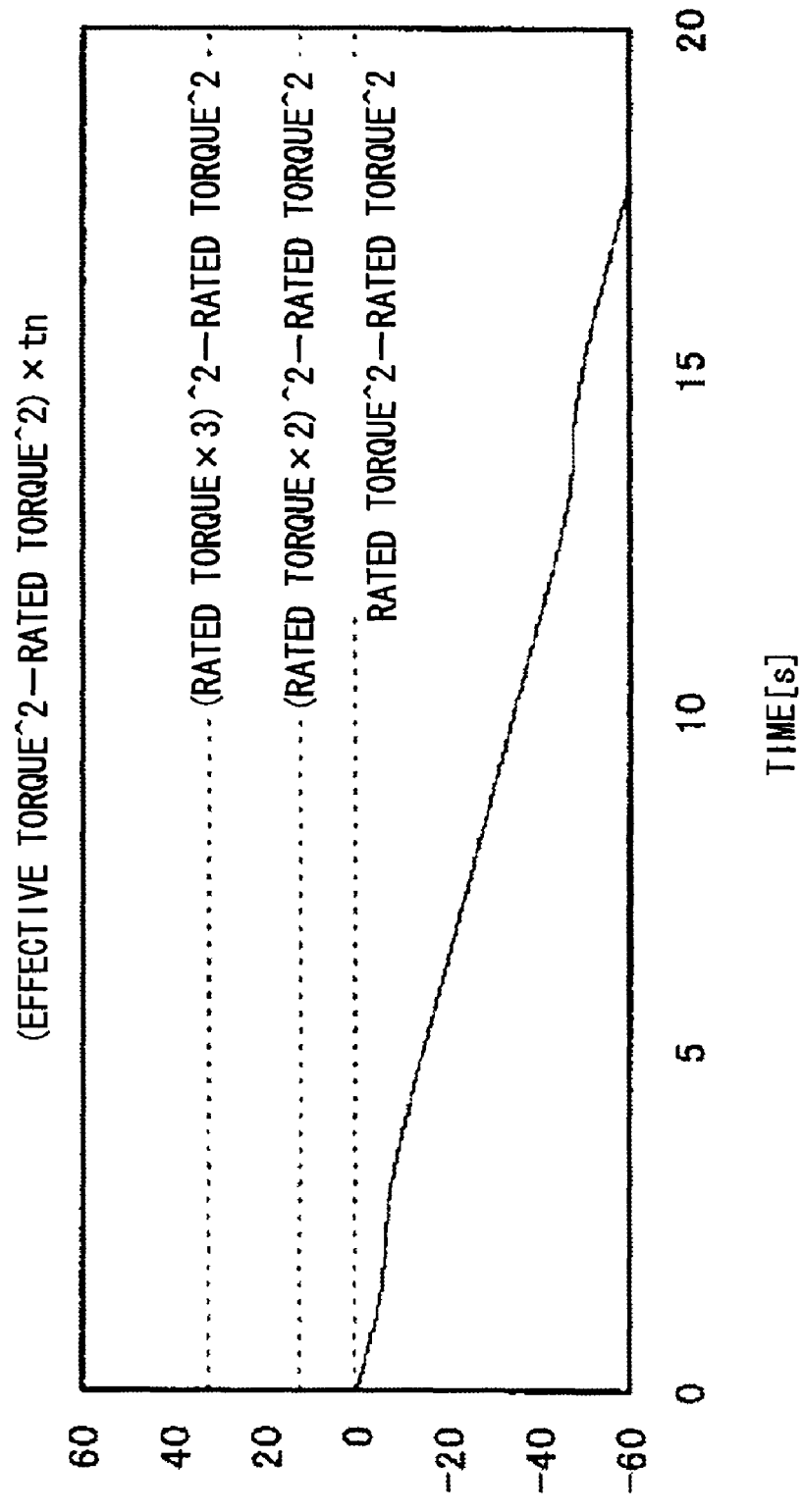
FIG. 6C A waveform chart to describe the operation.

If {(effective torque)$^2$ –(rated torque)$^2$}*$t_n$ is calculated according to the technique which is proposed by the present invention, the result is always negative as shown in the waveform of FIG. 6C (although the result is illustrated as being negative in order to show the values, it should be 0 as a calculation result as described earlier). Because a load which is applied to a motor amplifier is not higher than a rated level, there is no need to perform particular processing such as alarming.

Figure 7A:
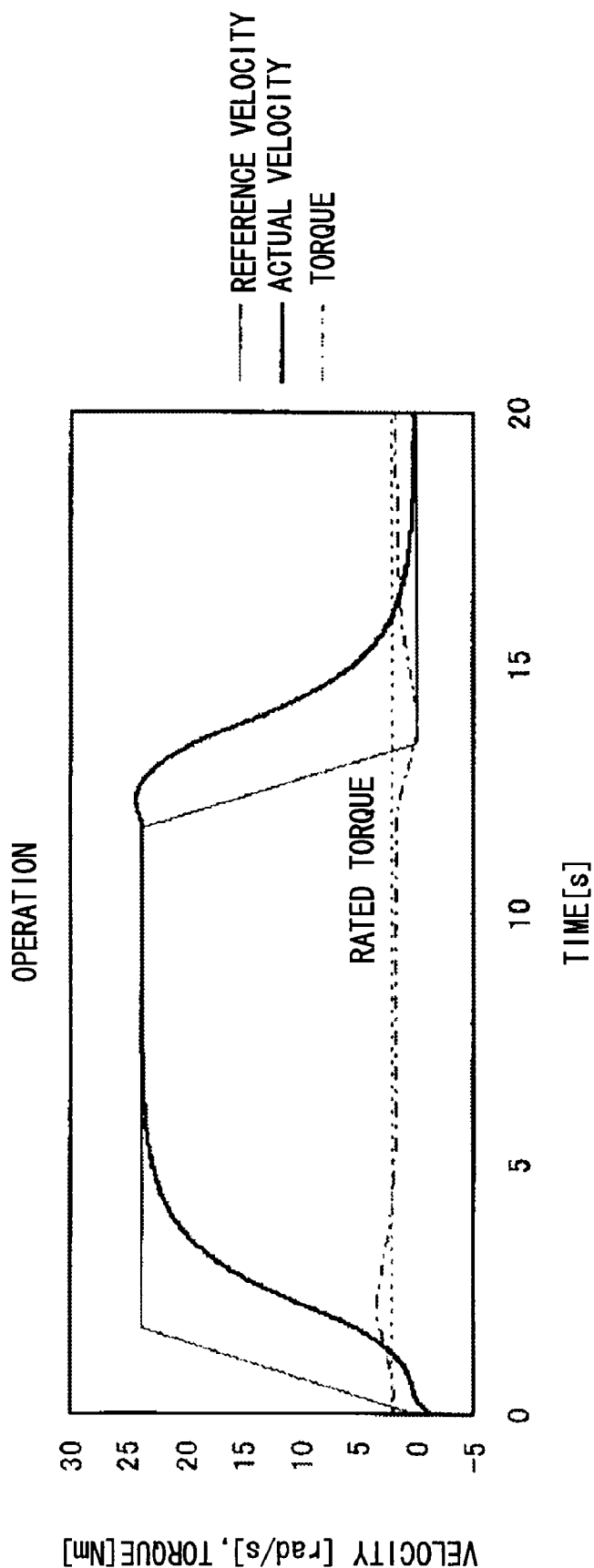
FIG. 7A A waveform chart to describe the operation.
Figure 7B:
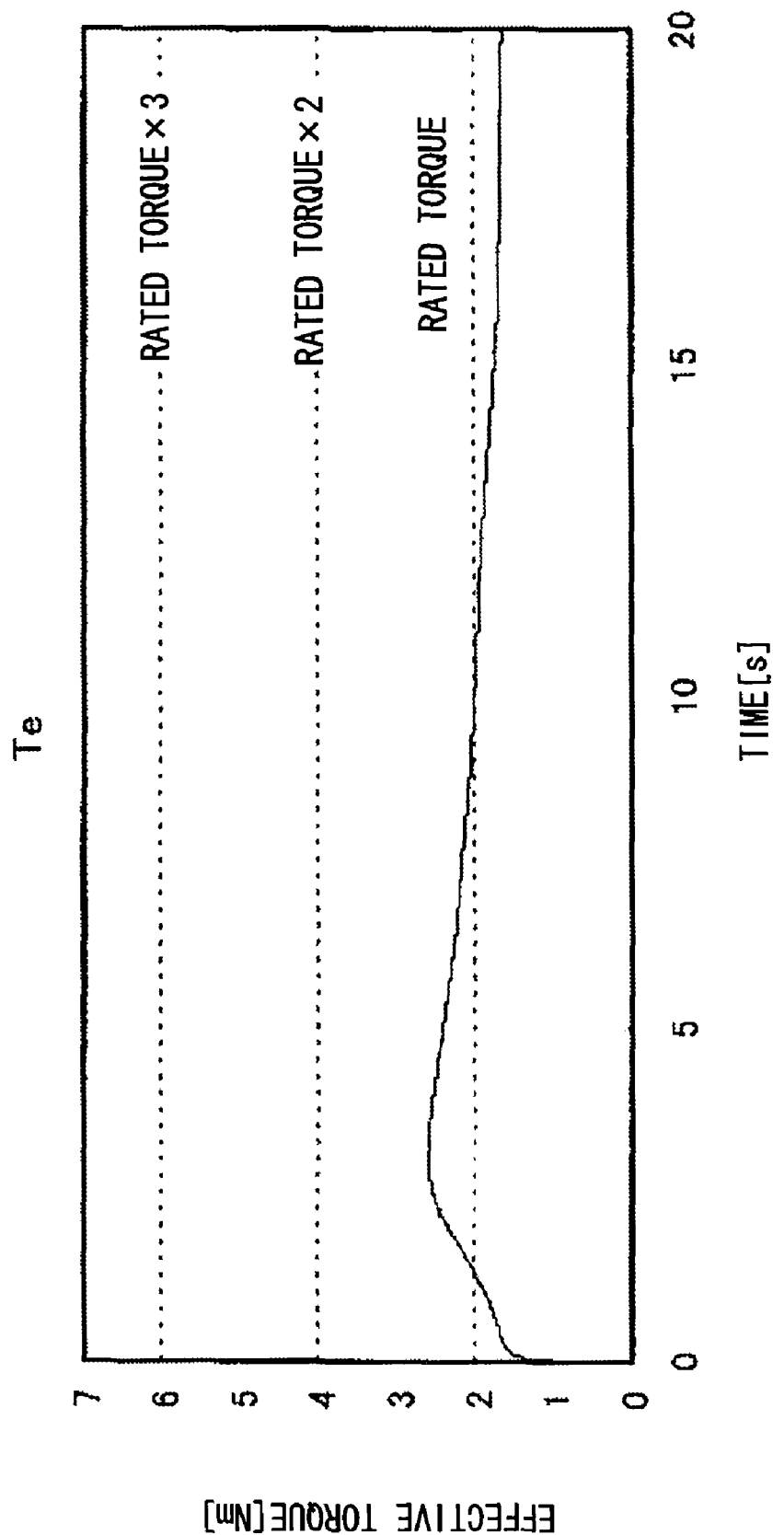
FIG. 7B A waveform chart to describe the operation.
Figure 7C:
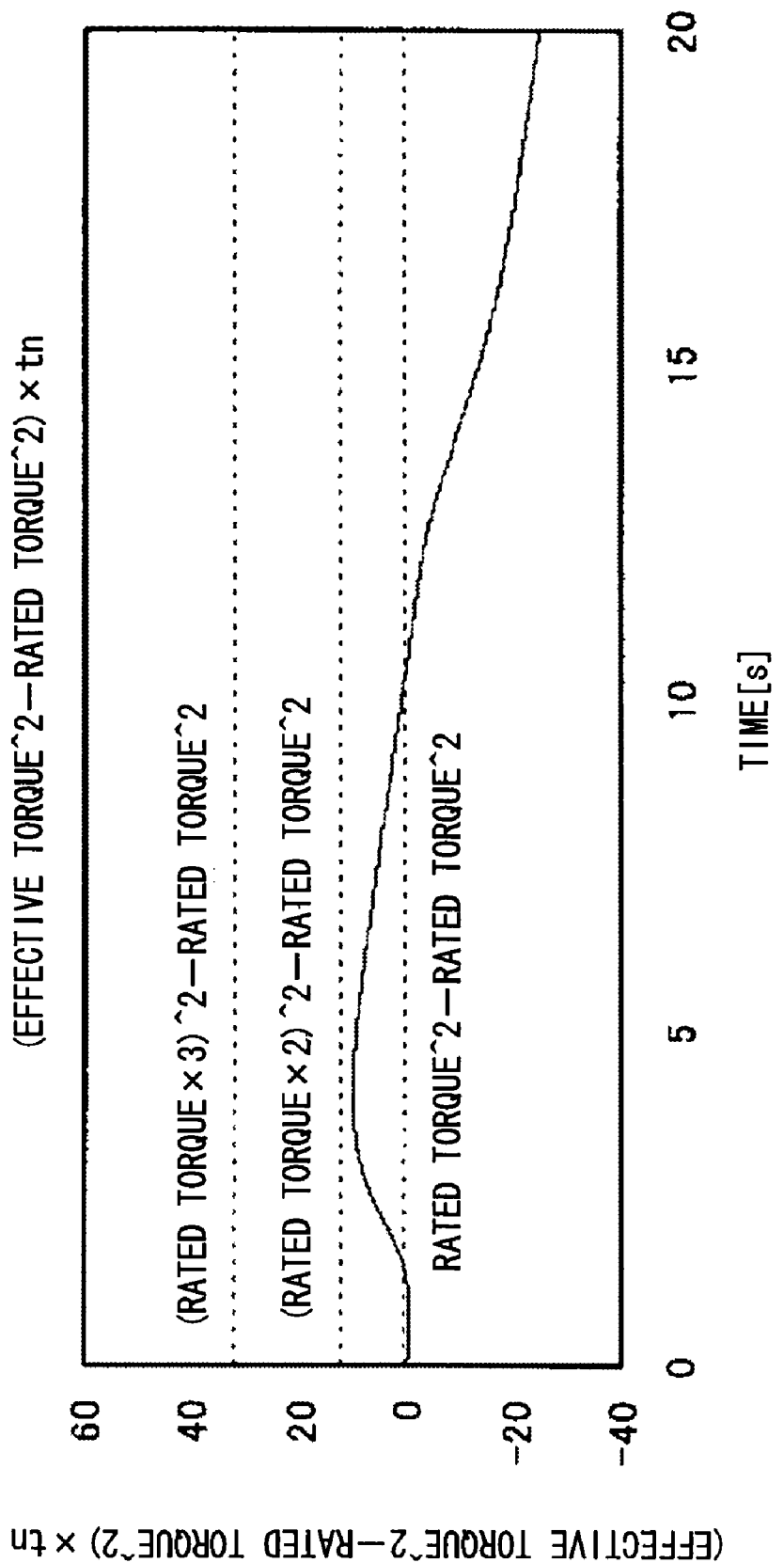
FIG. 7C A waveform chart to describe the operation.

The case where $\{(\text{effective torque})^2-(\text{rated torque})^2\}*t_n$ does not exceed $(\text{effective torque}*2)^2-\text{rated torque}^2$ is described below. This is the case of going up a slope with a certain degree of inclination (which requires a torque exceeding a rated torque). In this case, the operation pattern is as shown in the waveform of FIG. 7A, and an effective torque is as shown in the waveform of FIG. 7B. If $\{(\text{effective torque})^2-(\text{rated torque})^2\}*t_n$ is calculated according to the technique which is proposed by the present invention, the result is as shown in the waveform of FIG. 7C.

Generally, if a torque which is twice the level of a rated torque is continuously output for about 10 seconds, it causes a motor amplifier to stop due to overheating. Thus, if the state where $\{(\text{effective torque})^2-(\text{rated torque})^2\}*t_n$ is between $(\text{effective torque}*2)^2-\text{rated torque}^2$ and $(\text{effective torque})^2-\text{rated torque}^2$ continues for 5 seconds, for example, the effective torque monitoring device issues an alarm to a user, thereby notifying that keep going up a slope leads to the overheating of a motor amplifier.

An alarm may be issued by a known method such as generating a display on a display, flashing a lamp (LED etc.), sounding a buzzer, vibrating a handle grip or a vehicle body, sounding a synthetic voice or the like.

Figure 8A:
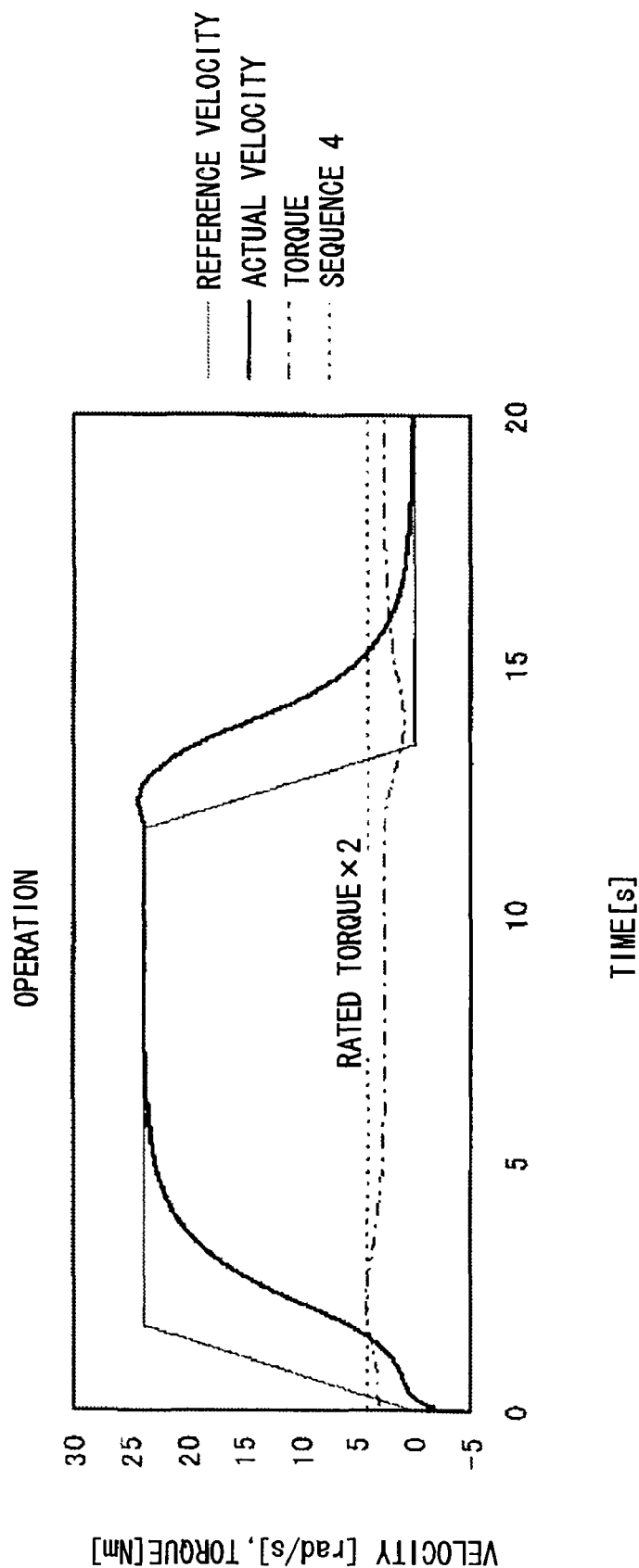
FIG. 8A A waveform chart to describe the operation.
Figure 8B:
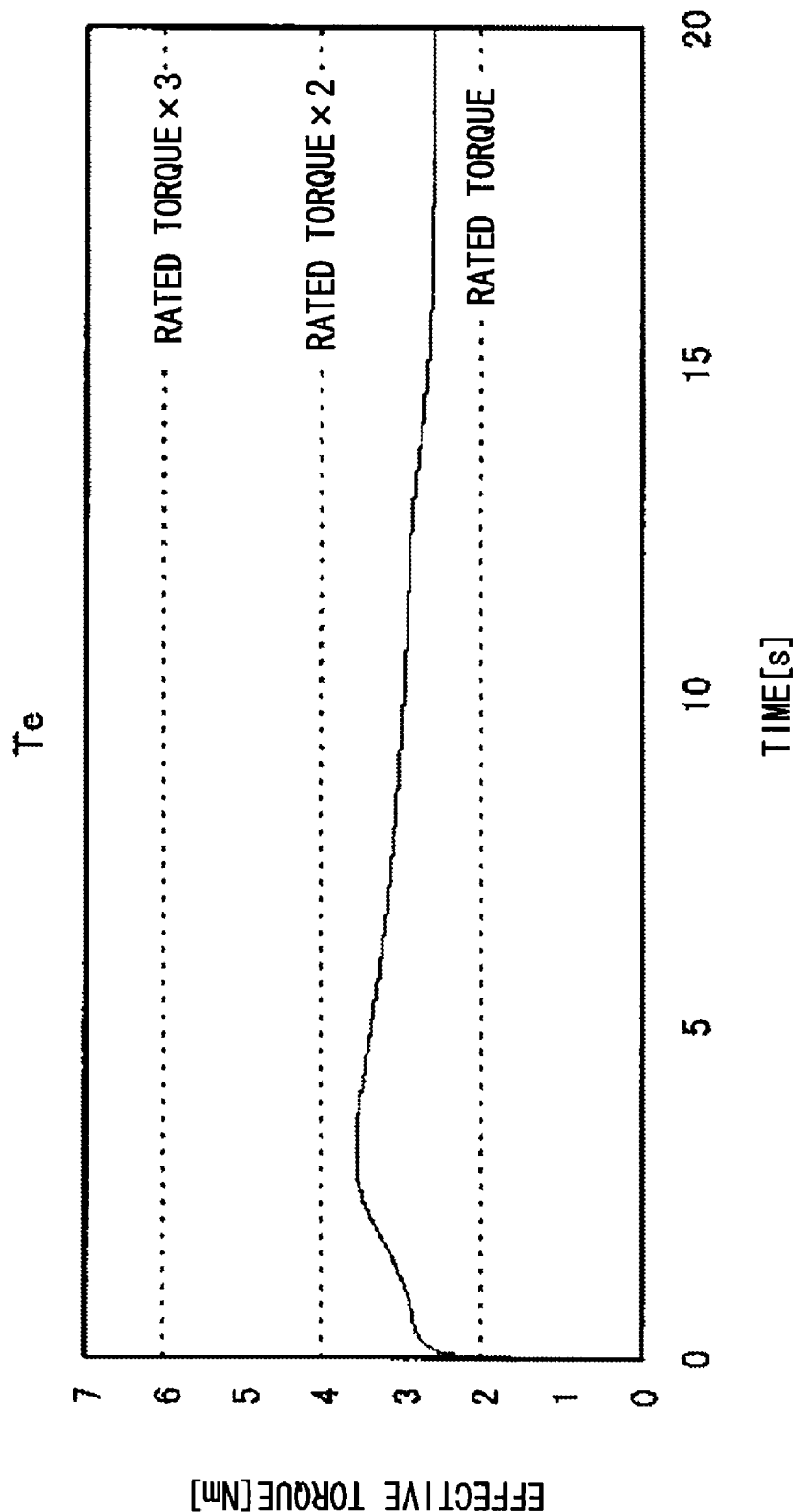
FIG. 8B A waveform chart to describe the operation.
Figure 8C:
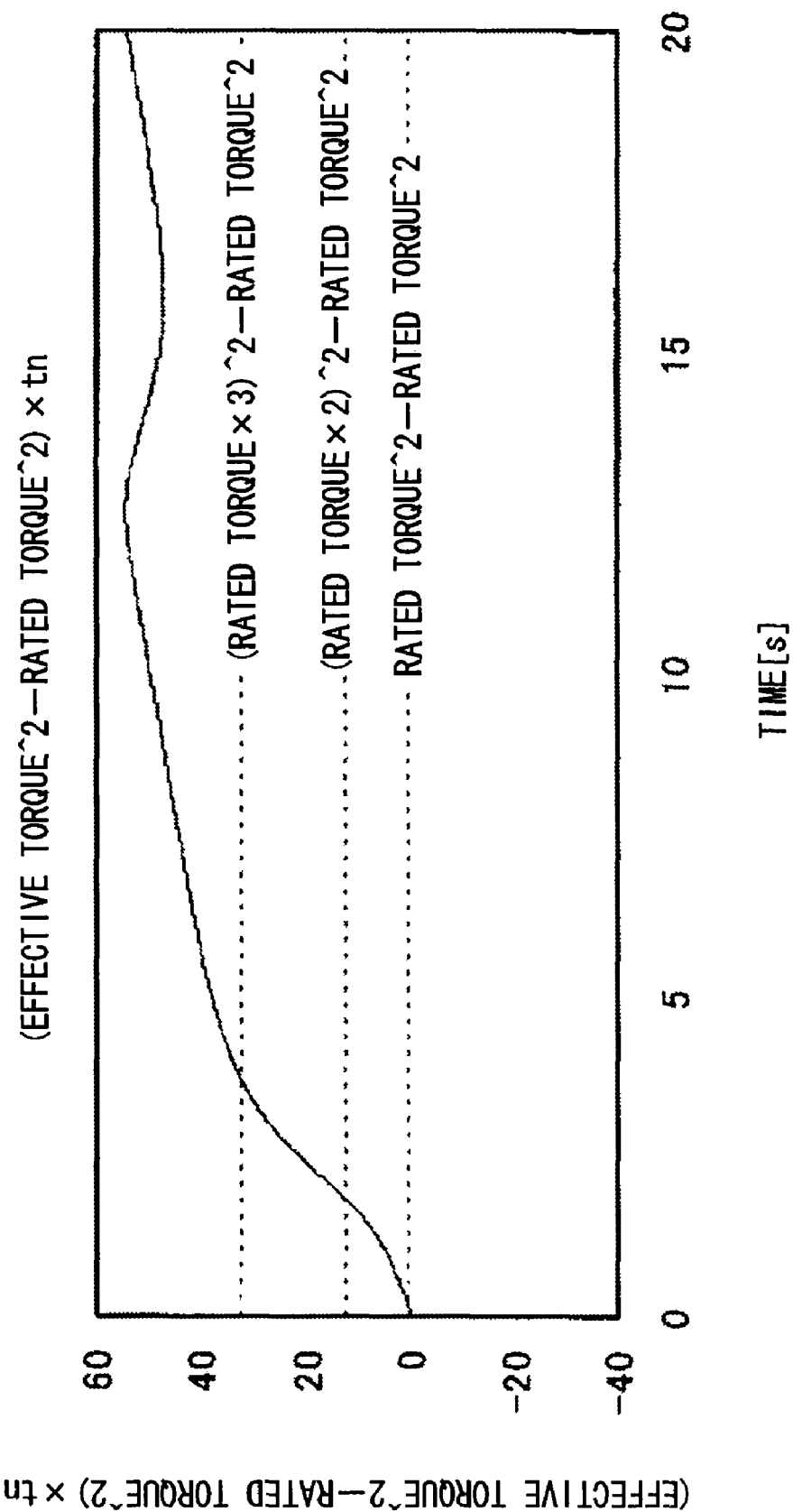
FIG. 8C A waveform chart to describe the operation.

The case where $\{(\text{effective torque})^2-(\text{rated torque})^2\}*t_n$ exceeds $(\text{effective torque}*2)^2-\text{rated torque}^2$ is described below. This is the case of driving up a slope with a large inclination (which requires a torque exceeding twice a rated torque). In this case, the operation pattern is as shown in the waveform of FIG. 8A, and an effective torque is as shown in the waveform of FIG. 8B. If $\{(\text{effective torque})^2-(\text{rated torque})^2\}*t_n$ is calculated according to the technique which is proposed by the present invention, the result is as shown in the waveform of FIG. 8C.

Generally, if a torque which is three times the level of a rated torque is continuously output for about 1 second, it causes a motor amplifier to stop due to overheating. Thus, if $\{(\text{effective torque})^2-(\text{rated torque})^2\}*t_n$ exceeds $(\text{effective torque}*2)^2-\text{rated torque}^2$, for example, it is necessary to put down a user promptly. In this case, processing such as issuing an alarm which has a higher urgency than the above-described alarm is performed so as to prompt a user to immediately get off the vehicle.

Figure 9:
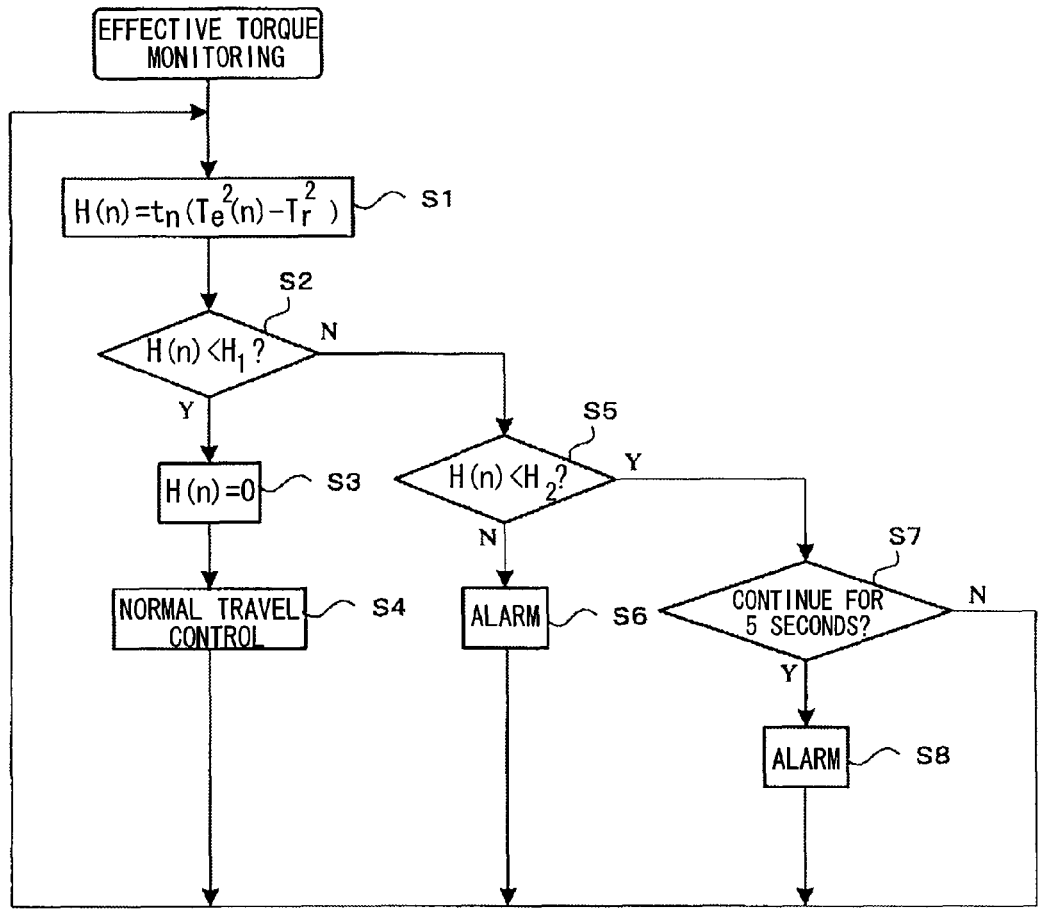
FIG. 9 A flowchart to describe the operation.

FIG. 9 shows an example of a flowchart to implement the above-described operation. Referring to FIG. 9, the calculation of $H(n)=t_n(T_e(n)-T_r^2) \ldots \{(\text{effective torque})^2-(\text{rated torque})^2\}*t_n$ is performed firstly (Step S1). Next, the determination as to whether the calculated operation value H(n) satisfies $H(n)<H_1$ (where $H_1=T_r^2-T_r^2=0 \ldots \{(\text{rated torque})^2-(\text{rated torque})^2\}$) is performed (Step S2). If H(n)<$H_1$ is satisfied (Y), H(n)=0 is set (Step S3), normal travel control is performed (Step S4), and then the process returns to Step S1.

On the other hand, if $H(n)<H_1$ is not satisfied in Step S2 (N), the determination as to whether the operation value H(n) satisfies $H(n)<H_2$ (where $H_2=(2T_r)^2-T_r^2=0 \ldots \{(\text{rated torque}*2)^2-(\text{rated torque})^2\}$) is further performed (Step S5). If $H(n)<H_2$ is not satisfied in Step S5 (N), an alarm is issued (Step S6), and then the process returns to Step S1.

Further, if $H(n)<H_2$ is satisfied in Step S5 (Y), the determination as to whether the state continues for 5 seconds is performed (Step S7). If it continues for 5 seconds or longer (Y), an alarm is issued (Step S8), and the process returns to Step S1. If it does not continue for 5 seconds in Step S7 (N), the process returns to Step S1 without performing any processing.

Therefore, according to the second embodiment, by obtaining the operation value of $\{(\text{effective torque})^2-(\text{rated torque})^2\}*(\text{elapsed time from start})$ in actual machine operation, it is possible to deal with an operating pattern which is not assumed and avoid the overheating of a motor amplifier by the use exceeding a rated torque of a motor, thereby preventing the occurrence of malfunction such as a sudden breakdown of a drive device.

Although a device of a related art fails to address an error factor which is different from the operating pattern that is assumed at the time of design and fails to calculate an effective torque accurately and practically since it requires a large storage area, causes the overflow of an integral and so on, it is possible to easily overcome such issues according to the present invention.

A travel device according to the present invention includes a driving unit to independently drive twin wheels having a prescribed rated torque and placed in parallel with each other, and a housing to couple the twin wheels, the housing including a detecting unit to detect a posture angle of the housing and a control unit to set a driving torque of the twin wheels according to information of the detected posture angle, in which the driving torque set by the control unit is used for driving the driving unit. The control unit calculates an operation value of $\{(\text{effective torque})^2-(\text{rated torque})^2\}*(\text{elapsed time from start})$ from start to a present time using the driving torque set to the twin wheels and controls driving of the twin wheels based on the calculated operation value, thereby dealing with an operating pattern which is not assumed, avoiding the overheating of a motor amplifier by the use exceeding a rated torque of a motor, and preventing the occurrence of malfunction such as a sudden breakdown of a drive device.

A control method of a drive device that sets a target state of a system having a prescribed rated torque, detects an operating state of the system, and drives the system by calculating a reference torque so as to bring the operating state closer to the target state according to the present invention includes calculating an operation value of $\{(\text{effective torque})^2-(\text{rated torque})^2\}*(\text{elapsed time from start})$ from start of the system to a present time using the calculated reference torque, and controlling driving of the system based on the calculated operation value, thereby enabling dealing with an operating pattern which is not assumed and increasing machine reliability and setting an appropriate safety factor so as to reduce device costs by eliminating (reducing) the opportunity of the use exceeding a rated torque of a servo motor.

Figure 10:
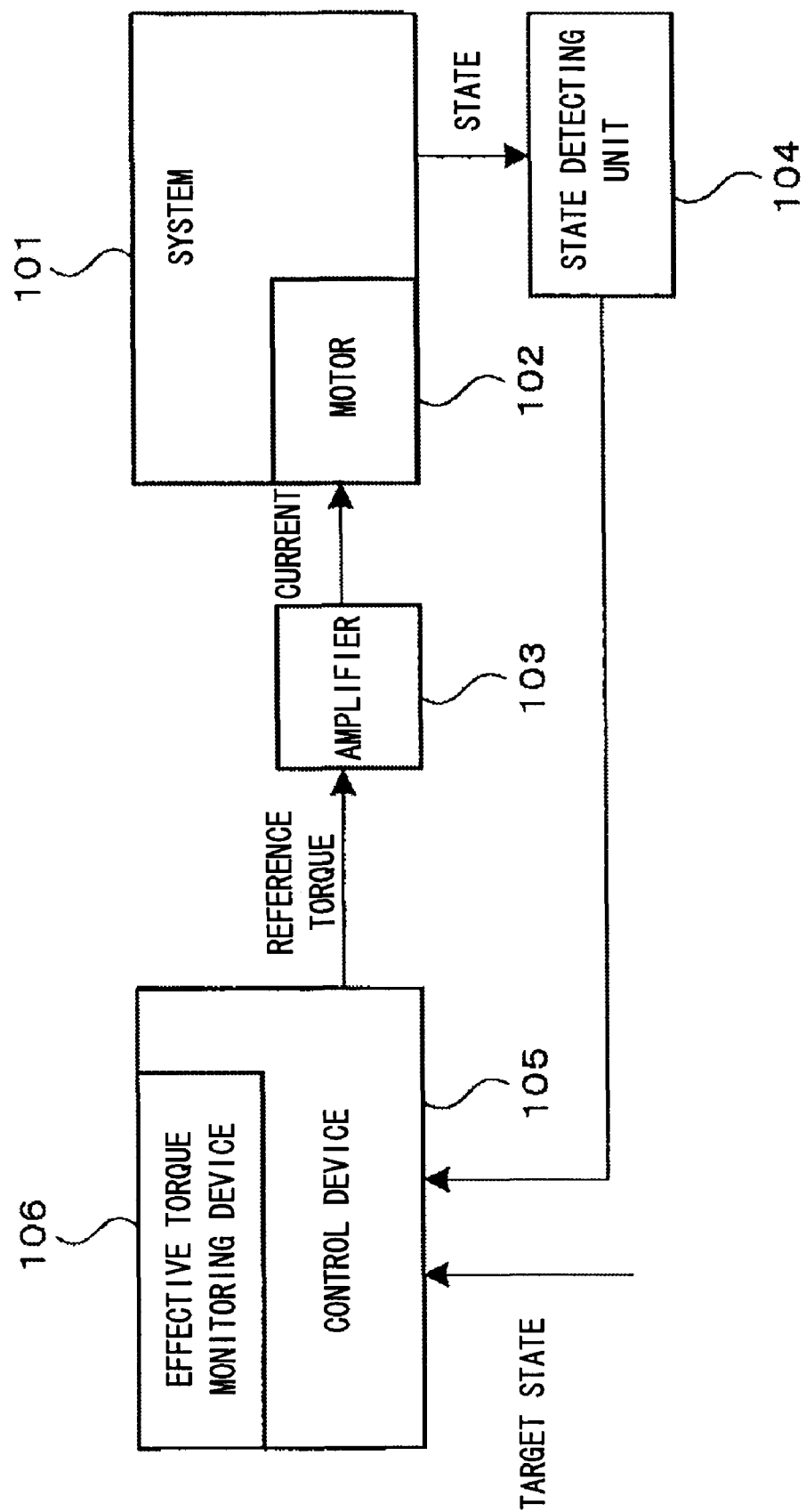
FIG. 10 A block diagram showing a typical structure according to the present invention.
Figure 11A:
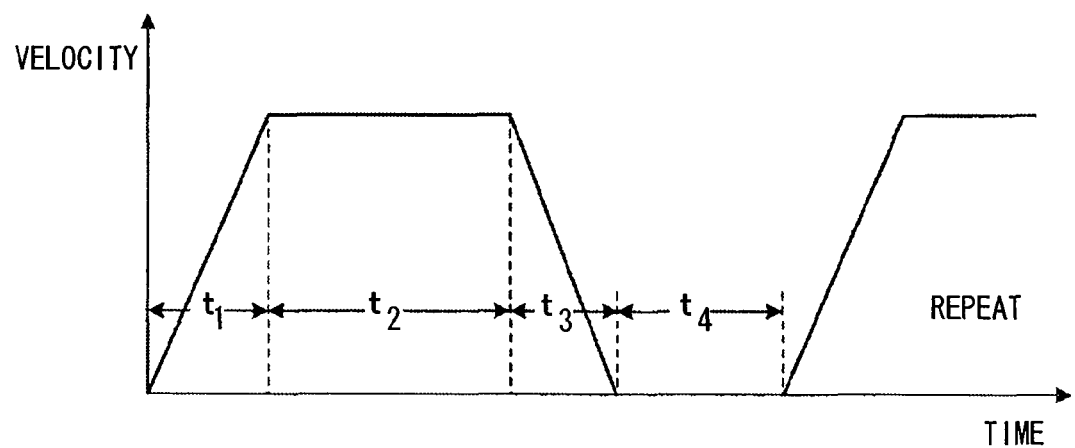
FIG. 11A A diagram to describe an operating pattern and a torque.
Figure 11B:
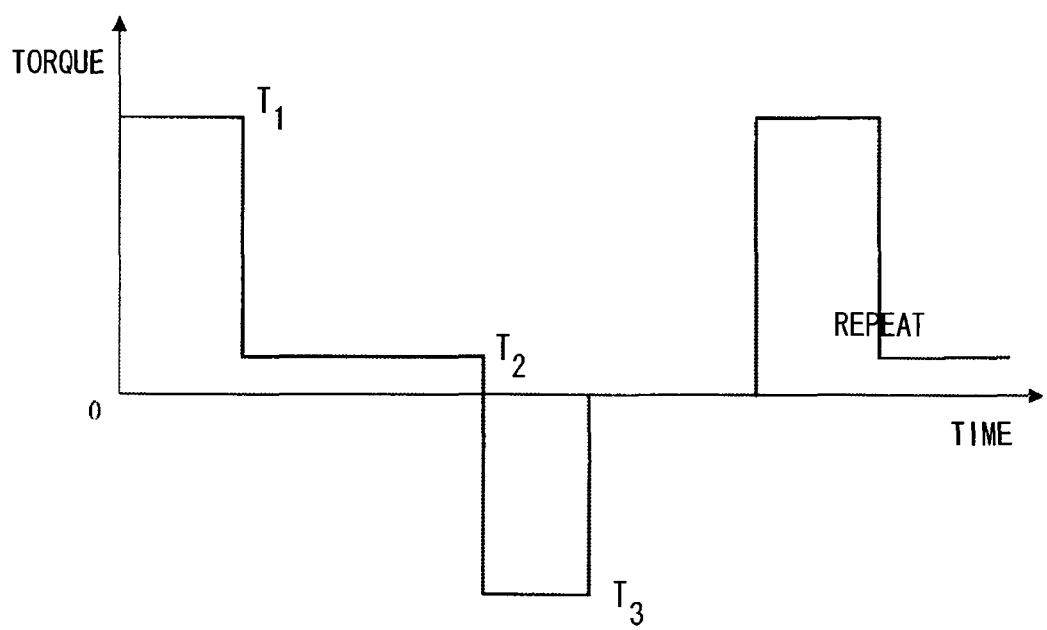
FIG. 11B A diagram to describe an operating pattern and a torque.

The drive device, the travel device and the drive device control method according to the present invention may be implemented by the structure shown in the block diagram of FIG. 10. Specifically, referring to FIG. 10, a motor 102 is placed in a system 101, and drive current is supplied to the motor 102 from an amplifier 103. The state of the system 101 is detected by a state detecting unit 104, and the detected state is supplied to a control device 105.

Further, a target state is supplied to the control device 105, and a reference torque which is calculated so as to become closer to the target state is supplied to the amplifier 103. An effective torque monitoring device 106 is placed in the control device 105, and the monitoring device 106 controls the generation of a reference torque in consideration of a rated torque of the motor 102. The present invention which is described in the foregoing is implemented by such a structure.

Therefore, the drive device, the travel device and the drive device control method according to the present invention have the following advantages.

1. By obtaining the value of $\{(\text{effective torque})^2-(\text{rated torque})^2\}*t_n$ in actual machine operation, it is possible to deal with an operating pattern or a load torque which are not assumed in advance.

2. By eliminating (reducing) the opportunity of the use exceeding a rated torque of a servo motor, it is possible to increase the machine reliability and set an appropriate safety factor so as to reduce device costs.
3. By calculating $\{(\text{effective torque})^2-(\text{rated torque})^2\}*t_n$ and devising a method of the calculation, it is possible to eliminate the need for storing all time varying reference torques from the start of operation to the present time $t_o$ and prevent the overflow of an integral in a practical use range.
4. It is possible to find an abnormal torque which occurs due to variation with time, failure or the like.
5. When the present invention is applied to a twin cycle, it is possible to avoid the overheating of a motor amplifier due to the use exceeding a rated torque of a motor and thereby prevent a vehicle from falling down due to a sudden breakdown of a drive device.

The present invention is not limited to the above-described embodiments, and various changes may be made without departing from the spirit of the invention.

INDUSTRIAL APPLICABILITY

The present invention is widely applicable to a drive device, a travel device and a drive device control method in which suitable drive control is performed under the rating which is specified for a drive system.

The invention claimed is:

1. A drive device comprising:
a setting unit to set a target state of a system having a prescribed rated torque;
a detecting unit to detect an operating state of the system; and
a control unit to drive the system by calculating a reference torque so as to bring the operating state closer to the target state, wherein
the control unit calculates an operation value of $\{(\text{effective torque})^2-(\text{rated torque})^2\}*(\text{elapsed time from start})$ from start of the system to a present time using the calculated reference torque and controls driving of the system based on the calculated operation value.

2. The drive device according to claim 1, wherein
the operation value is obtained by calculating (result of one unit time before)+$\{(\text{present reference torque})^2-(\text{rated torque})^2\}*(\text{unit time})$.

3. The drive device according to claim 1, wherein
the calculated operation value is compared with a value based on the rated torque, and driving of the system is stopped and/or an alarm is started according to a comparison result.

4. A travel device comprising:
a driving unit to independently drive twin wheels having a prescribed rated torque and placed in parallel with each other; and
a housing to couple the twin wheels, the housing including a detecting unit to detect a posture angle of the housing and a control unit to set a driving torque of the twin wheels according to information of the detected posture angle, the driving torque set by the control unit being used for driving the driving unit,
wherein the control unit calculates an operation value of $\{(\text{effective torque})^2-(\text{rated torque})^2\}*(\text{elapsed time from start})$ from start to a present time using the driving torque set to the twin wheels and controls driving of the twin wheels based on the calculated operation value.

5. The travel device according to claim 4, wherein
the operation value is obtained by calculating (result of one unit time before)+$\{(\text{present reference torque})^2-(\text{rated torque})^2\}*(\text{unit time})$.

6. The travel device according to claim 4, wherein
the calculated operation value is compared with a value based on the rated torque, and driving of the twin wheels is stopped and/or an alarm is started according to a comparison result.

7. A control method of a drive device that sets a target state of a system having a prescribed rated torque, detects an operating state of the system, and drives the system by calculating a reference torque so as to bring the operating state closer to the target state, comprising:
calculating an operation value of $\{(\text{effective torque})^2-(\text{rated torque})^2\}*(\text{elapsed time from start})$ from start of the system to a present time using the calculated reference torque; and
controlling driving of the system based on the calculated operation value.

* * * * *